(12) United States Patent
Spirito et al.

(10) Patent No.: US 7,715,849 B2
(45) Date of Patent: May 11, 2010

(54) USER POSITIONING

(75) Inventors: Maurizio Spirito, Helsinki (FI); Ville Ruutu, Espoo (FI)

(73) Assignee: Nokia Corporation, Espoo (FI)

( * ) Notice: Subject to any disclaimer, the term of this patent is extended or adjusted under 35 U.S.C. 154(b) by 751 days.

(21) Appl. No.: 10/470,902

(22) PCT Filed: Feb. 28, 2001

(86) PCT No.: PCT/EP01/02251

§ 371 (c)(1),
(2), (4) Date: Aug. 1, 2003

(87) PCT Pub. No.: WO02/063329

PCT Pub. Date: Aug. 15, 2002

(65) Prior Publication Data

US 2004/0067759 A1 Apr. 8, 2004

(51) Int. Cl.
*H04W 24/00* (2009.01)
(52) U.S. Cl. ............... 455/456.1; 455/404.2; 455/414.2
(58) Field of Classification Search ............. 455/404.2, 455/457, 456.1, 456.5, 456.6, 414.2
See application file for complete search history.

(56) References Cited

U.S. PATENT DOCUMENTS

| | | | | |
|---|---|---|---|---|
| 4,310,903 A | * | 1/1982 | Kay | 367/102 |
| 5,058,200 A | * | 10/1991 | Huang et al. | 455/456.2 |
| 5,293,642 A | * | 3/1994 | Lo | 455/456.2 |
| 5,508,707 A | * | 4/1996 | LeBlanc et al. | 342/457 |
| 5,649,289 A | * | 7/1997 | Wang et al. | 340/7.22 |
| 5,657,487 A | * | 8/1997 | Doner | 455/456.2 |
| 5,850,609 A | * | 12/1998 | Sugarbroad et al. | 455/456.1 |
| 5,987,322 A | * | 11/1999 | Gupta et al. | 455/432.1 |
| 6,026,305 A | * | 2/2000 | Salinger et al. | 455/456.3 |

(Continued)

FOREIGN PATENT DOCUMENTS

WO    WO 97/27711    7/1997

OTHER PUBLICATIONS

Drane C. "Positioning GSM Telephones", Apr. 1998, IEEE vol. 36, whole document.*

(Continued)

*Primary Examiner*—Charles N Appiah
*Assistant Examiner*—Kwasi Karikari
(74) *Attorney, Agent, or Firm*—Squire, Sanders & Dempsey L.L.P.

(57) ABSTRACT

The invention proposes a method for locating a network element, comprising the steps of obtaining (S1) the coordinates (xS, yS) of a second network element (BTS) to which the first network element (MS) is connected or attached; detecting (S2) a serving area (S), which is served by the second network element (BTS); detecting (S3) a propagation delay of the first network element with respect to the second network element (BTS); determining (S4) a propagation delay depending area (C), which is an area having a distance to the second network element (BTS) based on the propagation delay and a width based on the propagation delay; and forming (S5) an intersection area (I) of the serving area (S) and the propagation delay depending area (C); wherein a location estimate of the first network element (MS) is determined (S6) from the intersection area (I). Thus, an uncertainty area where a first network element is located can be reduced and the location accuracy can be improved.

16 Claims, 19 Drawing Sheets

U.S. PATENT DOCUMENTS

| | | | | |
|---|---|---|---|---|
| 6,031,490 | A | * | 2/2000 | Forssen et al. .............. 342/457 |
| 6,108,553 | A | * | 8/2000 | Silventoinen et al. .... 455/456.3 |
| 6,266,534 | B1 | * | 7/2001 | Raith et al. .............. 455/456.3 |
| 6,275,186 | B1 | * | 8/2001 | Kong .......................... 342/363 |
| 6,321,092 | B1 | * | 11/2001 | Fitch et al. ............... 455/456.5 |
| 2002/0123352 | A1 | * | 9/2002 | Vayanos et al. ............. 455/456 |
| 2004/0067759 | A1 | * | 4/2004 | Spirito et al. ............ 455/456.1 |

OTHER PUBLICATIONS

"Positioning GSM Telephones", Drane et al, IEEE Communications Magazine, vol. 36, No. 4, Apr. 1, 1998, pp. 46-54, 59, XP 000752570.

"Mobile Station Location with Heterogeneous Data", Spirito, IEEE VTS Fall VTC2000, 52$^{nd}$ Vehicular Technology Conference (Cat. No. 00CH37152), Fall 2000, vol. 4, pp. 1583-1589, XP002180107.

FCC, "Third Report and Order in the Matter of Revision of the Commission's Rules to Ensure Compatibility with Enhanced 911 Emergency Calling Systems," FCC 99-245, Washington D.C., Oct. 6, 1999.

J.H. Reed et al., "An Overview of the Challenges and Progress in Meeting the E-911 Requirement for Location Service," IEEE Communications Magazine, vol. 36, No. 4, pp. 30-37, Apr. 1998.

J-L. Lavroff et al., "European Perspectives for the Interworking of Satellite Navigation and Mobile Communication Infrastructures," in GNSS 2000 Conference, May 1-4, 2000, Edinburgh, Scotland.

R. Jurgen, "Smart Cars and Highways Go Global," IEEE Spectrum, vol. 28, pp. 26-36, May 1991.

ETSI GSM 05.10 Version 5.0.0, Digital Cellular Telecommunications System (Phase 2+); Radio Subsystem Synchronisation (GSM 05.10), May 1996, pp. 1-15.

ETSI/STC/SMG1, "Report of Location Services," Nov. 7-10, 1995, pp. 1-15.

V. K. Bhargava et al., "Personal Wireless Communications," IEEE International Conference, Feb. 19-21, 1996, pp. i-xi.

ETSI/STC/SMG1 Plenary 1/97, "Service Requirements for a Mobile Location Service," Mar. 10-14, 1997, pp. 1-3, Madrid, Spain.

TIP1.5/98-034, Ericsson, "Evaluation Sheet for the Uplink TOA Positioning Method," Jan. 21, 1998, pp. 1-6.

TIP1.5/98-021R8, Ericsson, Motorola, Nokia, Nortel, Siemens, "Evaluation Sheet for Enhanced Observed Timex Difference (E-OTD) Method," Aug. 17, 1998, pp. 1-27.

TIP1.5/98-132r3, Ericsson, SnapTrack, "Evaluation Worksheet for Assisted GPS," Jun. 3, 1998, pp. 1-15.

ETSI TS 101 724 V7.0.0, "Digital Cellular Telecommunications System (Phase 2+); Location Services (LCS); (Functional Description)—Stage 2 (GSM 03.71 version 7.0.0 Release 1998)," 1999, pp. 1-59.

3G TS 25.305 V3.2.0, "3$^{rd}$ Generation Partnership Project; Technical Specification Group Radio Access Network; Stage 2 Functional Specification of Location Services in UTRAN (Release 1999)," 2000, pp. 1-42.

J-L Lavroff et al., "European Perspectives for the Interworking of Satellite Navigation and Mobile Communication Infrastructures," 2000, Brussels—Luxembourg.

M.I. Silventoinen et al., IEEE, Nokia Research Center, "Mobile Station Emergency Location in GSM," 1996, pp. 232-238.

W. Clay Collier et al., IEEE Spectrum, "Smart Cars, Smart Highways," Apr. 1994, pp. 27-33.

A. Papoulis, "Probability, Random Variables, and Stochastic Processes", Third Edition, McGraw-Hill International Editions, Electrical and Engineering Series, 1991, pp. 3-666.

* cited by examiner

USER POSITIONING

FIELD OF THE INVENTION

The present invention relates to a method and a network control device for locating a network element and, thus, for locating a user of such a network element.

BACKGROUND OF THE INVENTION

The need for an efficient and accurate user positioning in wireless networks grows day by day. The position estimation of wireless callers to emergency numbers, as the "Enhanced-911" (E-911) mandatory in the U.S. by October 2001 and the E-112 under consideration by the European Community, is only one of the possible applications beside vehicle fleet management, intelligent transport systems (ITS's) and location-based billing.

To guarantee positioning in the whole coverage area, achieve different service requirements and handle the variety of location information, combinations of different location technologies have been considered and suitable signaling protocols proposed. Standardization of Mobile Stations (MS's) positioning in GSM networks started in 1995 within ETSI SMG (European Telecommunications Standards Institute Special Group Mobile) 1 after European operators asked for commercial services based on MS positioning and separately within T1P1 in the U.S., after the FCC (Federal Communications Commission) established the requirements for the E-911 service.

In 1997 the T1P1.5 subcommittee of T1P1 (T1P1 is a subgroup of T1, a committee of TIA, the North American Telecommunications Industry Association) was given the responsibility to lead the standardization activities. At the conclusion of the works, T1P1.5 proposed four positioning alternatives: three using measurements performed within the cellular network; namely, the Timing Advance (TA), Uplink Time Of Arrival (TOA) and Enhanced Observed Time Difference (E-OTD) procedures and one based on the Global Positioning System (GPS) technology, the Network-Assisted GPS procedure. All four procedures were included by ETSI in the GSM specifications Release '98 and Release '99 (see ETSI, "Digital Cellular Telecommunications System (Phase 2+); Location Services (LCS), (Functional Description)—Stage 2 (GSM 03.71 version 7.3.0 Release 1998)"—doc. ETSI TS 101 724, February 2000).

The Uplink TOA procedure is able to locate legacy handsets (i.e., handsets with standard software) but requires installation of new network elements called LMUs (Location Measurement Units) at each BTS site. The Enhanced OTD procedure requires installation of LMUs every 2-5 BTS's and software modification in the terminals. Also the Network-Assisted GPS procedure requires installation of reference GPS receivers besides the integration of a GPS receiver into the handset.

All procedures, including the Timing Advance, require the introduction of a new network element responsible for the location calculation called SMLC (Serving Mobile Location Center).

The principle of the Timing Advance is illustrated in FIG. 1. The Timing Advance (TA) describes the back-and-forth propagation time between the mobile station and the serving base station. It is used to avoid overlapping slots in communications. The distance d between the serving base station and the mobile station can be estimated using the TA:

$$d \cong TA \times (cT_b/2)$$

where $T_b=3.69$ μs is the bit period, $c=3\times10^8$ m/s is the speed of radio waves, and TA is an integer ranging from 0 to 63.

The Timing Advance procedure is the simplest procedure among the standardized ones. It requires only the addition of location calculation functionalities (i.e., the SMLC) in the network side and, since it uses information already available in nowadays networks, it is able to locate legacy handsets and it does not need the installation of additional measurement units.

The Timing Advance procedure can be applied also as back-up procedures for other standardized solutions. In some cases, in fact, the number of Base Transceiver Stations (BTS's) in case of Uplink TOA/Enhanced OTD or satellites, in case of Network-Assisted GPS, that can be used for positioning purposes is low or the quality of the measurement is so poor that none of such technologies can be used. The estimations obtained by using the Timing Advance technique can also be used as initial guess for the algorithms used to implement one of the standardized solutions (e.g. the E-OTD), in order to improve accuracy or speed of convergence of those algorithms.

SUMMARY OF THE INVENTION

Therefore, the object underlying the invention resides in providing a low-cost method for positioning a user.

This object is solved by a method for locating a network element, comprising the steps of
  obtaining the coordinates and the identity of a second network element to which the first network element is connected or attached;
  detecting a serving area, which is served by the second network element;
  detect a propagation delay of the first network element with respect to the second network element;
  determining a propagation delay depending area, which is an area having a distance to the second network element based on the propagation delay or other distance measurement or quantity and a width based on the propagation delay; and
  forming an intersection area of the serving area and the propagation delay depending area;
  wherein a location estimate of the first network element is determined within the intersection area.

Alternatively, the above object is solved by a network control device for locating a first network element, comprising
  a serving area determining means being adapted to obtain coordinates of a second network element, to which the first network element is connected or attached, and to detect a serving area, which is served by the second network element;
  a propagation delay depending area detecting means being adapted to detect a propagation delay of the first network element with respect to the second network element, and to determine a propagation delay depending area, which is an area having a distance to the second network element based on the propagation delay and a width based on the propagation delay; and
  a location estimating means being adapted to form an intersection area of the serving area and the Propagation delay depending area, and to determine a location estimate of the first network element from the intersection area.

Thus, by referring also to the serving area of the cell served by the second network element (e.g., a base station), the location accuracy can be improved since the actual area where the first network element may be located can be narrowed.

Furthermore, no additional hardware in the first network element is necessary. That is, a mobile station does not have to be provided with circuits dedicated for location purposes (like GPS or the like). Hence, no additional costs for mobile stations are required.

Moreover, the method according to the invention may be performed in a central network control device such that only in this device additional hardware (basically databases for the serving areas of a plurality of second network elements, i.e., base stations) are required.

The step of determining the propagation delay depending area may comprise the step of calculating an estimated distance and calculating a confidence interval for the estimated distance, wherein the propagation delay depending area is determined based on the estimated distance and the confidence interval. By this measure, the propagation delay depending area may be calculated more accurately.

The propagation delay depending area is a circular crown around the second network element, the radius and width thereof depending on the propagation delay. It is noted that the radius may be zero (e.g., in case the propagation delay is zero).

The estimated distance and the confidence interval may calculated based on statistical data of the propagation delay. By this measure, statistical distributions of the propagation delay can be taken into account. Hence, the propagation delay depending area can be determined more accurately, resulting in a further improvement of the accuracy of the location estimate. The statistical data comprises a propagation delay measurement error, for example.

Alternatively, the statistical data may comprise the estimation error of the distance between the two network elements as obtained by comparing the true distance and the distance estimated using the propagation delay.

Also, already available location information of the first network element may be used to form the statistical data. The already available location information of the first network element may be obtained using other, more accurate location methods, such as Enhanced Observed Time Difference (E-OTD), Angle OF Arrival (AOA), GPS, or Assisted-GPS.

The propagation delay may be indicated by a Timing Advance (TA). This value is represented in bits and is in particular already available. Hence, the propagation delay can easily be obtained.

The serving area may be a geographical area to which the second network element is associated. For example, the serving area may be defined by a geographical map. Thus, the serving area can be exactly defined.

The serving area (S) may be the geographical region the borders of which are mathematically defined by the coordinates of the origin $(x_0,y_0)$, the orientation of the serving area measured taking $(x_0,y_0)$ as origin of a polar reference $(\phi_s)$, the angular width of the serving area $(\Delta\phi_s)$, a front radius $(R_F)$ which defines the distance from the origin $(x_0,y_0)$ in the angular region inside the range $\phi_s\pm\Delta\phi_s$, and a back radius $(R_B)$ which defines the distance from the origin $(x_0,y_0)$ in the angular region outside the range $\phi_s\pm\Delta\phi_s$.

The step of obtaining the coordinates of the second network element can be performed by checking a Cell Identity of the cell the second network element is associated to. For example, in GSM this information is available, such that no additional hardware or software has to be provided in order to obtain the CI.

The calculation of location estimates may be performed in dependence on coordinates of the second network element and/or propagation delay values beforehand. That is, the location estimates can be calculated in non-real time. By this measure, the real-time calculation power required can be reduced strongly.

The location estimates calculated beforehand may be stored in look-up tables, wherein the location estimates can be retrieved based on the coordinates of the second network element and propagation delay. Thus, upon a location request, only an access on database (look-up tables) has to be performed, which lightens the real-time calculation load.

The first network element may be a mobile station (MS), whereas the second network element may be a base station.

The method may further comprise the steps of
identifying neighbor network elements, which can be received by the first network element, and
obtaining hearablity areas defining areas in which the signal level of neighbor network elements is equal or higher than a predetermined minimum signal level,
wherein the step of forming an intersection area comprises forming an intersection area of the serving area, the propagation delay depending area and the hearablity areas of those neighbor network elements identified by the first network element.

Thus, by using neighbor network elements (e.g., neighbor base stations), the intersection area can be further refined. Hence, the uncertainty area where the first network element may be located can be further reduced and the location accuracy can be improved.

The hearability area of each neighbor network element may be stored beforehand in a database, and wherein the step of obtaining the hearbility areas is performed by accessing the database. Hence, the actual calculation of location estimates can be performed in non-real time, such that no complex real-time calculations are necessary.

In the identifying step the strength (RXLEV) of a signal received from a neighbor network element is measured in GSM system by the first network element on the BCCH frequency of the neighbor network element. That is, information already available in GSM, for example, can be used in the method according to the invention. Therefore, no additional means for measuring the signal strength are required.

In the step of obtaining the hearability areas, the hearability areas may be ordered in dependence on the received signal strength, and wherein in the step of forming the intersection area the order is considered. Thus, the hearability areas having the highest signal strength are used first. Thus, it can be ensured that the first network element is indeed in such a hearability area. By this measure, the location accuracy can be further improved.

For each neighbor cell a plurality of coverage areas may be provided each of which has a different signal level, wherein the step of forming an intersection is performed by using the coverage areas having different signal levels. By this measure, not only the existence of neighbor network elements is considered, but also the signal strength thereof by selecting for each neighbor cell the coverage area within which the signal level corresponds to the measured one. Thus, the uncertainty area can be further reduced, such that the location accuracy can be further improved.

The method may further comprise the step of using information about a probability density of locations of the first network elements within the serving areas of second network elements. By this measure, external information are used which allow to judge the probability where a user of a first network element may be located. By this measure, the intersection area can be weighted such that the location estimate is not assumed in the center point of the intersection area, but is shifted corresponding to the probability density.

The probability density information may comprise empirical user density studies, geographical information, population density information, traffic information and the like.

The probability density information are stored beforehand in a database for each serving area. Thus, as mentioned above, the location estimate can be calculated beforehand in non-real time.

The location estimate of the first network element may be the center point of the intersection area, or, alternatively, the location estimate of the first network element may be the weighted center point of the intersection area using probability density of locations of first network elements as weight.

Furthermore, the confidence area of the first network element, where the first network element is located with a certain probability, may be estimated using the intersection area. The confidence area estimate may be the intersection area.

Alternatively, the confidence area of the first network, where the first network element is located with a certain probability, may be estimated using the serving area. That is, the confidence area estimate may be the serving area.

Moreover, the invention proposes a network control device for performing the method described above.

The network control device may further comprise a look-up table retrieving device adapted to access a look-up table storing location estimates which have been calculated beforehand in look-up tables, wherein the look-up table retrieving device is adapted to retrieve the location estimates based on the coordinates of the second network element and the propagation delay value.

The network control device may be a Location Server (LS).

In addition, the invention proposes a network location system comprising the above network control device and a network management device for preparing the look-up table. The network management device may be a Location Management Tool (LMT).

The intention also proposes a method for locating a network element, comprising the steps of
  obtaining the identity of a second network element to which the first network element is connected or attached;
  detecting a serving area, which is served by the second network element;
  wherein a location estimate of the first network element is determined from the serving area.

Moreover, the invention proposes a method for locating a network element, comprising the steps of
  identifying neighbor network elements, which can be received by the first network element, and
  obtaining hearablity areas defining areas in which the signal level of neighbor network elements is equal or higher than a predetermined signal level, and
  forming an intersection area of the hearablity areas of those neighbor network elements identified by the first network element,
  wherein a location estimate of the first network element is determined from the intersection area.

In addition, the invention proposes a method for locating a network element, comprising the steps of
  obtaining the coordinates and of a second network element to which the first network element is connected or attached;
  detecting a propagation delay of the first network element with respect to the second network element;
  determining a propagation delay depending area, which is an area having a distance to the second network element based on the propagation delay and a width based on the propagation delay; and
  identifying neighbor network elements, which can be received by the first network element, and
  obtaining hearablity areas defining areas in which the signal level of neighbor network elements is equal or higher than a predetermined signal level,
  forming an intersection area of the propagation delay depending area and the hearablity areas of those neighbor network elements;
  wherein a location estimate of the first network element is determined from the intersection area.

Furthermore, the invention proposes a method for locating a network element, comprising the steps of
  obtaining the coordinates of a second network element to which the first network element is connected or attached; and
  using information about a probability density of locations of first network elements,
  wherein a location estimate of the first network element is determined from the probability.

By the above method, a location estimate can be determined with low costs, but still with sufficient accuracy.

The invention also proposes corresponding network control devices.

It is noted that in the present description, the terms "connected" and "attached" with respect to the first network element (e.g., MS) are meant as follows: If the MS is connected, it is active and has a communication going. If the MS is attached, it is turned on but it has not any communication going on, neither a channel assigned (for example, GSM mobile in idle mode, or "cramped" as it is usually said). Thus, according to the present invention, the location of the user can be determined when the MS is connected or attached. Hence, for locating a user it is not necessary that the user actually performs communication.

BRIEF DESCRIPTION OF THE DRAWINGS

The present invention will be more readily understood with reference to the accompanying drawings in which.

DETAILED DESCRIPTION OF PREFERRED EMBODIMENTS

Figure 1:
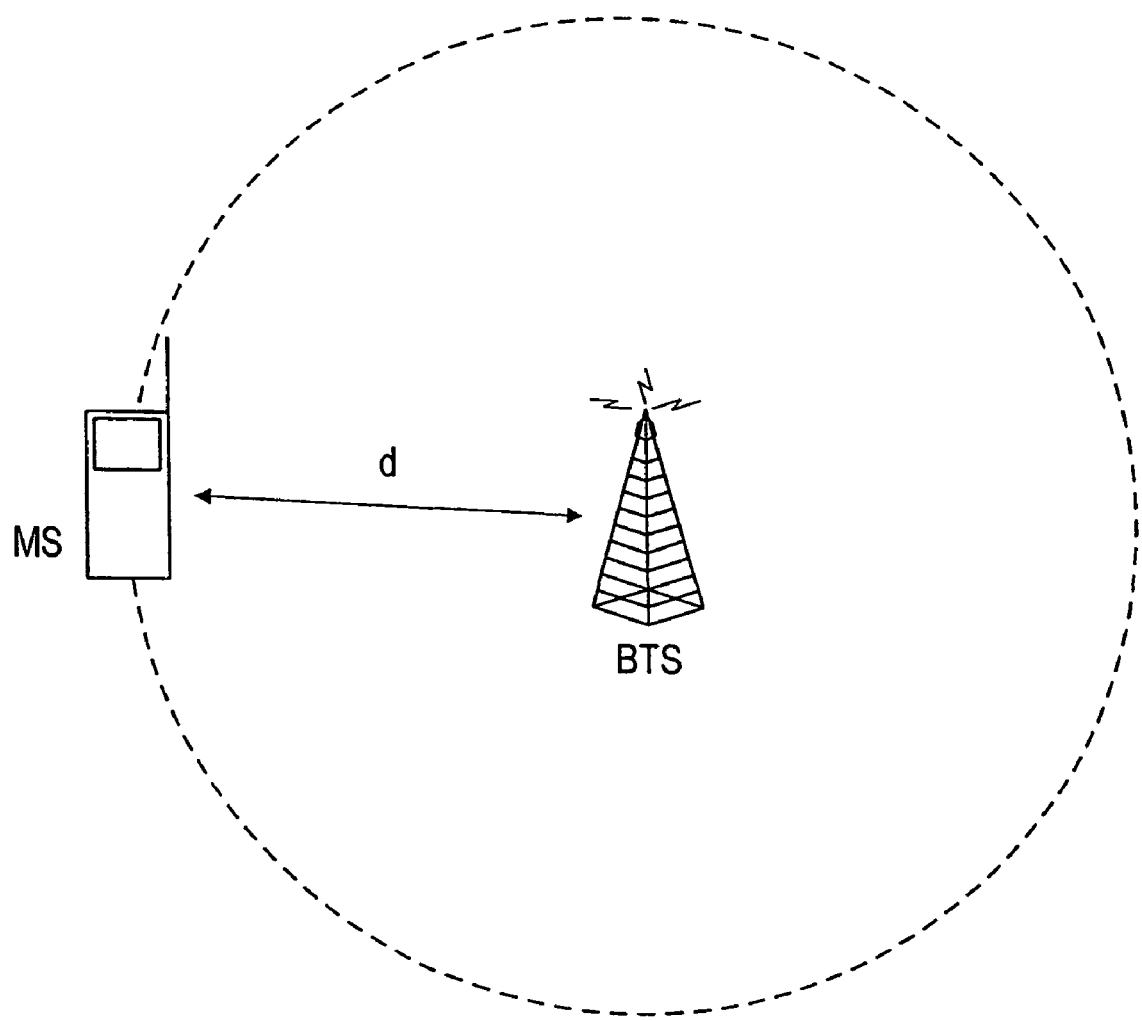
FIG. 1 shows a graphical representation of the TA concept.

In the following, preferred embodiments of the invention is described in more detail with reference to the accompanying drawings.

First Embodiment

According to the first embodiment, an algorithm is used that extends the Timing Advance (TA) concept.

Namely, from the service deployment point of view, the Timing Advance procedure has a very high potential. Operators can start offering location services based on the Timing Advance system. Such services can be provided to all customers with reasonable additional costs (for both customers and operators). The introduction of services based on the Timing Advance procedure allows at the same time to build awareness and create needs of location-based services in the market. When a sufficient set of location-based services have been launched and the market demand for better location services exists, operators can start deploying more expensive location systems in their networks starting with the Enhanced OTD and continuing with the Assisted GPS.

The algorithm according to the first embodiment extends the Timing Advance (TA) concept by integrating the information available in the standardized Timing Advance solution with:

geographical map of the area served by the serving cell, and/or statistical properties of the TA measurements.

For simplicity, the GSM system is referred to in the description of the embodiments. However, the present invention is applicable to all the existing systems based on the GSM standard (e.g., the GSM900, GSM1800 and the North American Personal Communication System, PCS 1900) and to all the systems that use measurements similar to the one considered in this document. In addition, the invention can also be applied to UMTS (Universal Mobile Telecommunication System) thanks to the Cell Coverage procedure supported by the standards Release 1999 and the Round Trip Time (RTT) similar to the GSM Timing Advance, which is planned to be supported in future releases of the UMTS standards.

The Timing Advance positioning procedures standardized for GSM Release 1998 and Release 1999 deliver to the Serving Mobile Location Center (SMLC) at least the following pieces of information:

Identity of the serving BTS (Cell Identity (CI)) and

Timing Advance (TA) from the serving BTS.

The CI identifies uniquely the BTS (Base Transceiver Station) that has in charge the communication with the MS (Mobile Station) to be located. The TA is an estimate of the propagation delay between MS and serving BTS, used in the GSM system to avoid overlapping of bursts at the BTS side.

Provided that a database containing the geographical coordinates of the BTS's in the network is available, the CI allows to determine the geographical location of the serving BTS. The TA can be used as an estimate of the distance between MS and serving BTS; thus the TA defines a circle (in a 2-dimensional scenario) centered in the serving BTS on which the MS can be located.

The TA-circle is the simplest location information that can be determined by combining CI and TA. However, with the procedure according to the first embodiment described hereinafter, it is possible to obtained more refined location estimates if the following data is available:

geographical map of the area served by the serving cell and/or

Statistical properties of the TA measurements.

In the following, the data needed for the algorithm and the data produced by the algorithm are described in short.

Figure 2:
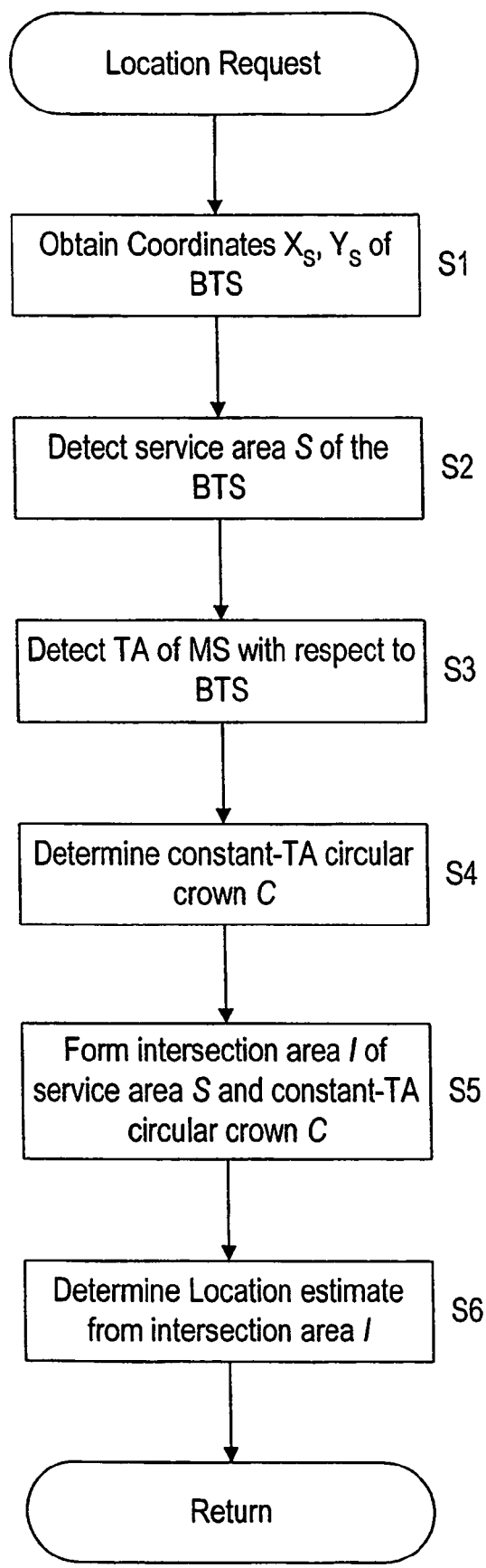
FIG. 2 shows flow chart of the location procedure according to a first embodiment.

The input/additional information needed by the procedure is:

Input:
Cell Identity of the serving BTS: CI
Timing Advance from the serving BTS: TA
Confidence coefficient for the Timing Advance measurement: $\gamma$
Confidence coefficient for the location estimate: $\xi$ Additional Information available:
BTS coordinates
Serving cell maps
Percentile levels of the TA measurement error The output of the algorithm is:

Output:
Estimate of the MS location: $\hat{x}, \hat{y}$
Confidence region of the location estimate The location algorithm partially relies on the statistical procedure to estimate the MS-to-serving BTS distance and its confidence level. This, however, is described later in the description. In the following, the different steps of the procedure for locating a mobile station according to the first embodiment is described by referring to the flow chart of FIG. 2.

1. Select the coordinates of the serving BTS using the CI: $x_S, y_S$ (Step S1).

When the CI of the serving cell is given, the x-y coordinates of the cell identified by such CI, $(x_S, y_S)$, are retrieved from the database of BTS coordinates.

2. Select the serving cell map: S (Step S2).

Figure 3:
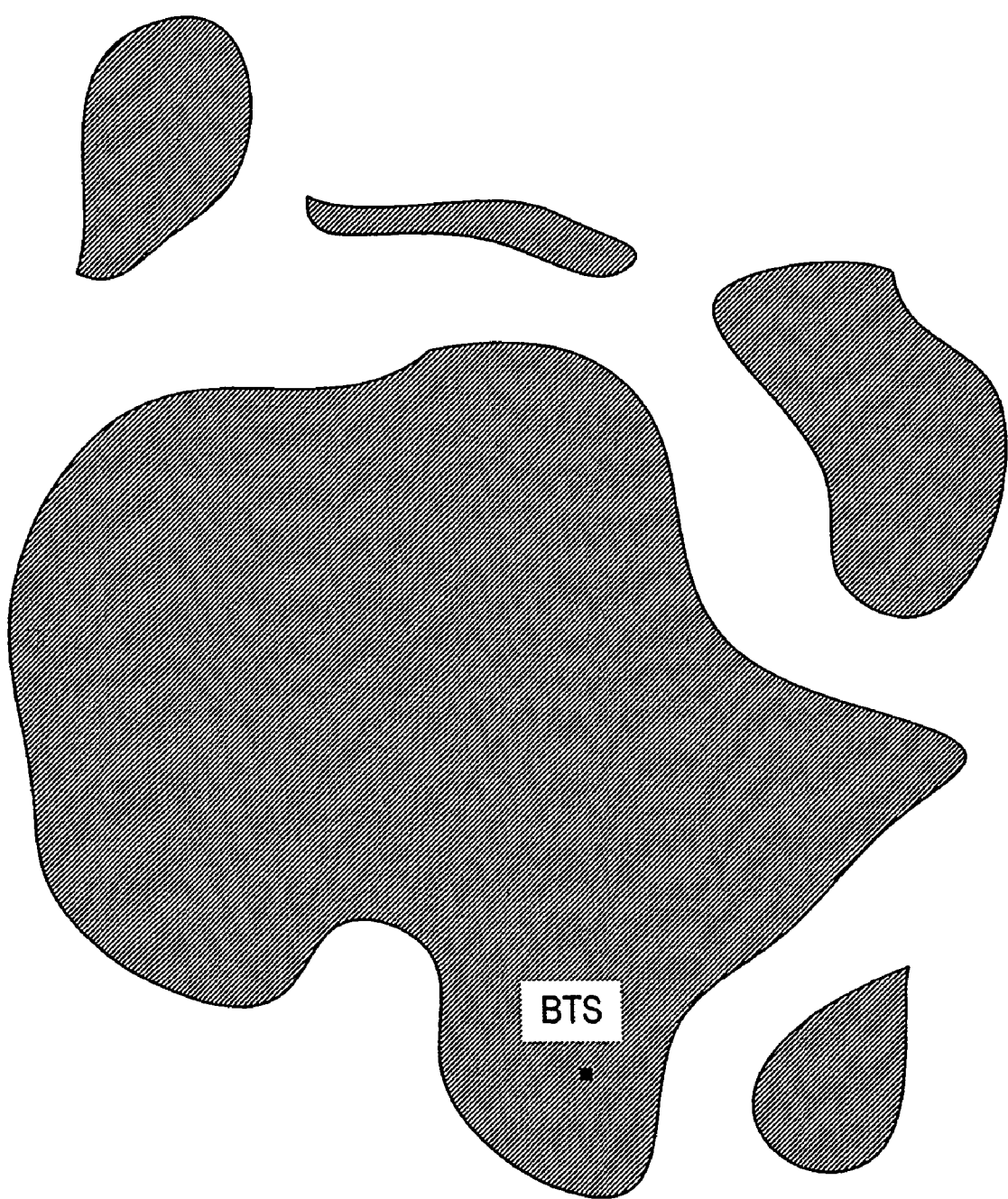
FIG. 3 shows an example of a serving area S.

Analogously as in the previous step, the CI is used to select the serving map, S, corresponding to the current CI. S is typically determined by a network planning tool which uses a large set of information such as BTS configuration parameters, 3-dimensional terrain maps, tuned propagation models, etc. and, in order to determine the serving area, takes into account also the presence of other BTS's in the network. Such map consists of a set of coordinates pairs such that the cell identified by CI is serving in the region defined by such coordinates. An example of serving area is in FIG. 3.

3. Determine the parameters of the constant-TA circular crown, C (Steps S3, S4):

First, the actual TA value is detected (step S3). Then, a region with the shape of a circular crown, C, (in the following referred to as constant-TA circular crown) around the BTS can be formed based on the TA (step S4).

In particular, the serving cell coordinates, TA and statistical properties of the TA measurement are used to define the constant-TA circular crown, C, where the MS location is situated with a certain confidence level, $\gamma$.

Figure 4:
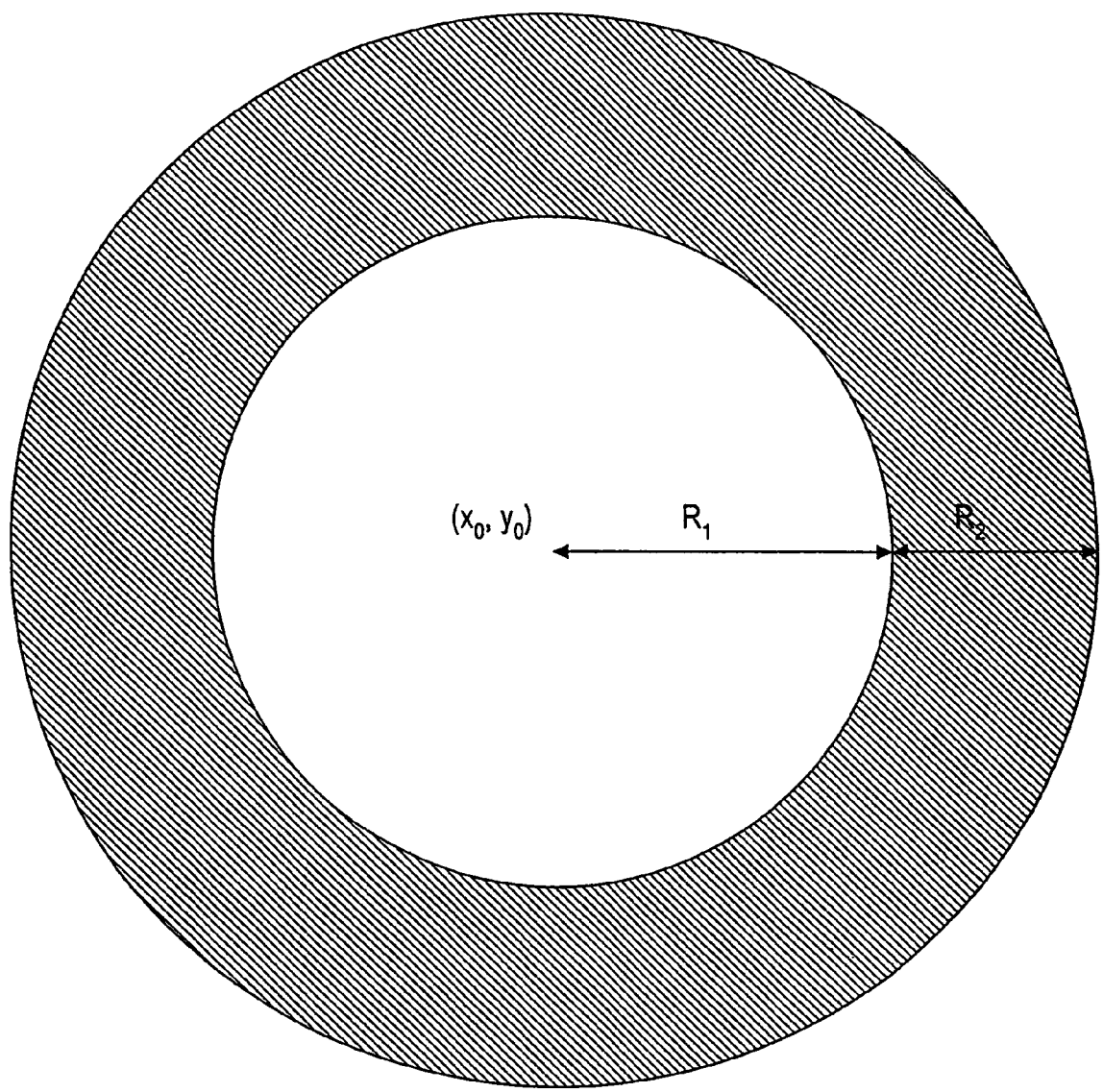
FIG. 4 shows a constant-TA circular crown C.

The constant-TA circular crown is depicted in FIG. 4; its mathematical definition in an arbitrary x-y reference system is:

$$C:\{(x,y)\epsilon IR^2: R_1 \leq \sqrt{(x-x_0)^2+(y-y_0)^2} \leq R_1+R_2\} \quad (1)$$

where:
- $(x_0, y_0)$: coordinates of the origin;
- $R_1$: inner radius; and
- $R_2$: uncertainty radius.

It is noted that $x_0$ and $y_0$ correspond to the coordinates of the serving BTS. Furthermore, $R_1$ and $R_2$ are such that with probability $\gamma$ the exact distance between MS and serving BTS, d, is within the interval $[R_1, R_1+R_2]$. That is, the uncertainty radius, $R_2$, describes the width of the so-called crown.

$$Pr(R_1 \leq d \leq R_1+R_2)=\gamma \quad (2)$$

The uncertainty radius $R_2$ represents the uncertainty of the TA measurements. It is again noted that the TA value has 64 levels (in GSM) such that there are several steps, i.e., intervals.

The radii concerned, i.e., $R_1$ and $R_2$, can be provided beforehand in a corresponding database. However, these radii can also be calculated by exploiting the knowledge of the statistical properties of the TA measurements. Such a procedure will be described later on in the description. Nevertheless, a solution is already presented here. That is, according to the procedure mentioned above, $R_1$ and $R_2$ can be determined as follows:

$$R_1 = d_{TA} - X_{(1+\gamma)/2}; \quad R_2 = X_{(1+\gamma)/2} - X_{(1-\gamma)/2} \quad (3)$$

where ($T_b$=3.69 µs is the bit period and c=3×10$^8$ m/s is the speed of light), $$d_{TA} = \begin{cases} \frac{1}{4} \times (cT_b/2) \cong 138 \text{ m} & \text{if } TA = 0 \\ TA \times (cT_b/2) & \text{if } TA > 0 \end{cases}$$

and $X_{(1\pm\gamma)/2}$ is the $$100\frac{1\pm\gamma}{2}\%$$

percentile of the TA measurement error (see table 1, which is described later). Depending on the cases, the inner radius can be also zero.

4. Estimate the MS location and its confidence region from the region I=S∩C (steps S5, S6).

The region S includes all possible locations of the MS's in communication with the cell identified by the CI. The region C includes the possible locations of the MS's which use the given TA while connected or attached with the BTS identified by the CI. The MS location is thus included in the intersection between S and C, that is I.

Figure 5:
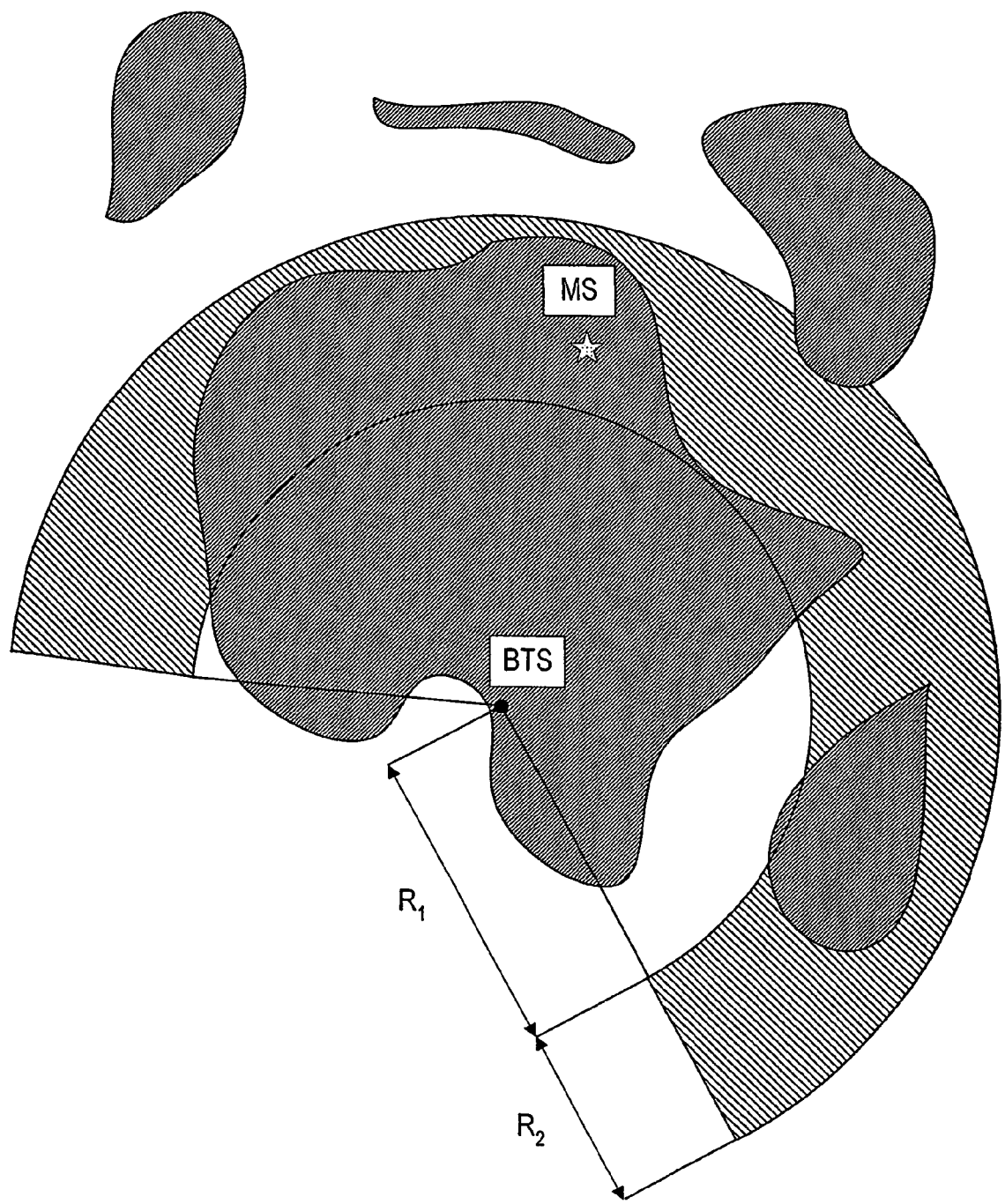
FIG. 5 shows a MS location estimated as the center point of the intersection between serving area and constant-TA circular crown.

An example is shown in FIG. 5. A location estimate for the MS is illustrated in the figure in the intersection area of the constant-TA crown and the serving area S.

The most straightforward way to estimate the MS location is to determine the center point of the intersection area (I). This is illustrated in FIG. 5. A more detailed algorithm to determine the center point and its confidence region is proposed later in the description of the first embodiment (see equations (17) to (36)).

Summarizing, the location algorithm according to the first embodiments estimates the MS location coordinates as follows:

Input:
  Cell Identity of the serving BTS: CI
  Timing Advance from the serving BTS: TA
  Confidence coefficient for the Timing Advance measurement: $\gamma$
  Confidence coefficient for the location estimate: $\xi$
Additional Information available:
  BTS coordinates
  Serving cell maps
  Percentile levels of the TA measurement error
Output:
  Estimate of the MS location: $\hat{x}, \hat{y}$
  Confidence region of the location estimate
Algorithm:
1. Select the coordinates of the serving BTS using the CI: $x_s, y_s$
2. Select the serving cell map: S
3. Determine the parameters of the constant-TA circular crown C (see FIG. 4)

$$\begin{cases} \text{Origin}: x_0 = x_s; & y_0 = y_s \\ \text{Radii}: R_1 = d_{TA} - X_{(1+\gamma)/2}; & R_2 = X_{(1+\gamma)/2} - X_{(1-\gamma)/2} \end{cases}$$

where $$d_{TA} = \begin{cases} \frac{1}{4} \times (cT_b/2) \cong 138 \text{ m} & \text{if } TA = 0 \\ TA \times (cT_b/2) & \text{if } TA > 0 \end{cases}$$

and $X_{(1\pm\gamma)/2}$ is the $$100\frac{1\pm\gamma}{2}\%$$

percentile of the TA measurement error (see table 1).
4. Estimate the MS location and its confidence region from the region I=S∩C.

Figure 6:
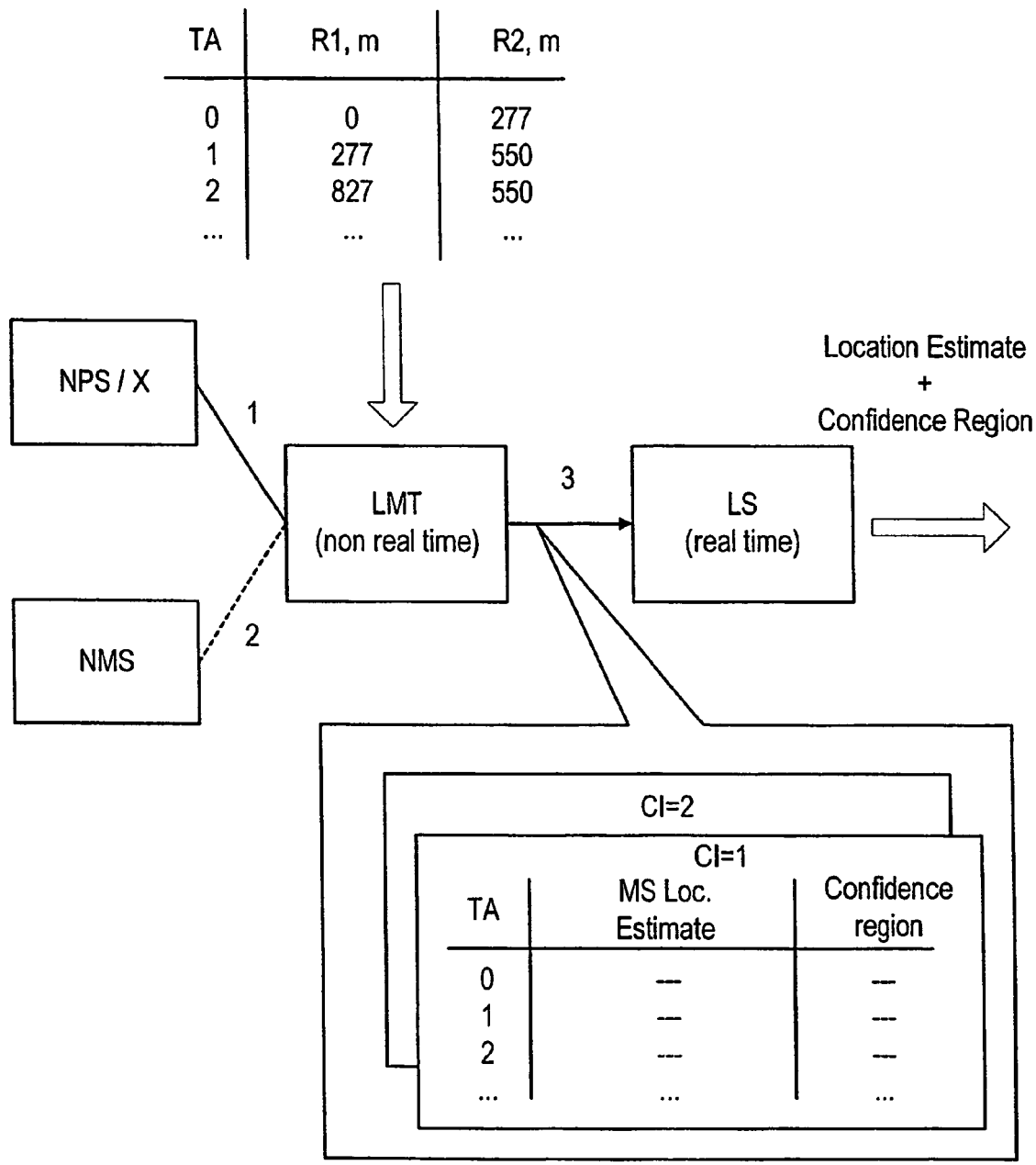
FIG. 6 shows the VELOCITA concept according to the first embodiment.

In the following, an implementation of the location technique according to the first embodiment is described with reference to FIG. 6. This implementation is called VELOCITA (VEctorial LOcation with CI-TA) hereinafter. The main elements thereof are:
  NPS: Network Planning System
  LMT: Location Management Tool
  LS: Location Server The connection with a Network Management System (NMS) is also shown; its role in the overall picture will be discussed later.

In the VELOCITA concept, the LMT receives BTS's coordinates and serving maps from the NPS. Tables containing the radii of the constant-TA circular crown, $R_1$ and $R_2$ (or alternatively, the TA error percentile levels) can be entered/updated by the user and they are stored in the LMT.

For each CI, the LMT selects the corresponding serving map and for each possible TA value (ranging from 0 to 63) generates a constant-TA circular crown by using the TA table. Afterwards, the LMT estimates the MS location and its confidence region from the intersection between serving map and constant-TA circular crown. The LMT determines also the confidence region associated to each location estimate. The LMT repeats this procedure for each cell and each TA value. The final result is a table for each CI where the location estimates/confidence regions corresponding to each TA are stored. Such tables are uploaded and stored in the LS.

In terms of the standardized Timing Advance procedure, the LS acts as SMLC as it receives the location requests and delivers the location estimates. When an external application sends to the LS the location request containing CI and TA, the LS picks the table corresponding to the correct CI; selects the row corresponding to the received TA and delivers to the external application the location estimate and the confidence region stored in such row.

It is noted that the LS is a very delicate element of the system. It must be very reliable and it must process as many location requests as possible in real time. For capacity reason, the amount of calculation carried out in the LS must then be kept very low. The VELOCITA concept accomplishes this task as the amount of calculation carried out in the LS is very limited. The majority of calculation power is required in the LMT that, on the other hand, does not need to produce the location estimates in real time.

In normal operational conditions the interaction between LMT and LS is limited to updating the location tables (location estimates and confidence regions). Only at the start-up of the system a large amount of data must be uploaded to the LS; in fact the LMT processes all the maps provided by the NPS and uploads them to the LS. After the system is "up and running" a mechanism should trigger the generation of (a limited set of) new location tables only when a change in the network parameters determines the generation of new serving maps in the NPS.

LS and LMT work in parallel; the location calculation is kept completely separated from the management of location requests; thus it does not affect the capacity of the system. For these reasons the VELOCITA concept provides a high reliability and high capacity implementation of the Timing Advance procedure.

Thus, according to the VELOCITA concept, the location estimates are calculated beforehand. That is, when a location request is received by the LS, the actual location estimate is looked up in a database table according to the actual CI and the actual TA. As described above, the LMT is the non-real time system calculating the location estimates and LS is the real time system responding to the location requests with location estimates from a look-up table. The location estimates calculated in the LMT are uploaded to the LS. The data needed for the calculation are obtained from the NPS or NMS.

The database mentioned above can also be separated in two relational databases or database tables: the CI level information may be stored in a first database table, whereas the TA level (location estimate and confidence area) information may be stored in a second database table. With a proper indexing of the table and a relation between the tables, a fast look-up of the location estimates is possible.

Next, further implementation issues are discussed.

As already mentioned, the algorithm is derived keeping the features of GSM system in mind however an extension to the UMTS system is possible. Of particular interest is the implementation of a WAP (Wireless Application Protocol) location system according to the VELOCITA concept in FIG. 6.

WAP phones will in fact send to the network CI and TA of the serving cell to allow location-based applications. The current view is that CI and TA will be sent to the LS, which in turns will deliver the MS location estimate.

The VELOCITA concept suits very well the need to have a reliable LS able to respond to a large amount of location requests in real time.

Performance of the location algorithm in terms of accuracy depends on correctness of network information and reliability of measurement models.

Regarding the Network Information, an implementation in a real environment requires the network information to be constantly updated. For what concerns BTS coordinates, CI and serving maps the connection with NPS should be in principle enough to meet this requirement. However, in many practical cases the information stored in NPS does not reflect accurately the current status of the network (sometimes operators change parameters in the network, add BTS's, re-home cells, etc. without updating the information in their NPS). For this reason, the connection with another element which contains more reliable network information such as a Network Management System (NMS) could be beneficial. This connection could be used for cross-checking CIs and/or BTS's coordinates stored in NPS and NMS and, eventually, alert the LS when an inconsistency is found.

Regarding the Measurement Models, the data stored in the TA table determines the TA measurement model used for location calculation purposes. This data depends on the environment and could also change with the time. Thus, in order to achieve satisfactory performance, it should be adjusted continuously.

In first implementations, it could be too complicated to adjust continuously the measurements models. However, an extensive campaign of TA measurements could be conducted in the network where the system is going to be installed and the TA measurement models derived off-line from a comparison between collected TAs and corresponding true MS-to-serving BTS distances.

In future implementations, the TA tables should be generated automatically. When location techniques other than the Timing Advance (for example E-OTD, stand-alone GPS or Assisted GPS) will be implemented, the E-OTD, GPS, etc. location estimates could be used to calculate the reference MS-to-serving BTS distance to be compared with the measured TA and the models updated automatically, perhaps on a cluster of cells/cell basis. If neither real-time nor non real-time models for the TA measurement error are available, the radii $R_1$ and $R_2$ can be calculated by considering only the TA quantization levels, as follows:

$$R1 = \begin{cases} 0 & \text{if } TA = 0 \\ \left(TA\frac{1}{2}\right) \times (cT_b/2) & \text{if } TA > 0 \end{cases}$$

$$R2 = \begin{cases} \frac{1}{2} \times (cT_b/2) \cong 277 \text{ m} & \text{if } TA = 0 \\ cT_b/2 \cong 550 \text{ m} & \text{if } TA > 0 \end{cases}$$

The location system should also provide a location estimate when a TA is not available. To this purpose, the LMT can add a line to the location table that is not associated to any TA value. The location estimate could be at the center point of the serving map and the confidence region could be a circle centered at the MS location estimate ($R_1$=0).

Thus, as mentioned above, according to the first embodiment, a location algorithm is proposed that can be implemented in the framework of the Timing Advance procedure standardized in the GSM specifications Release 1998 and 1999. The Mobile Station (MS) location is calculated by using information made available in the Serving Mobile Location Center (SMLC) by standardized GSM procedures, namely Cell Identity (CI) and Timing Advance (TA). In combination with CI and TA, the algorithm uses information on the statistical distribution of the TA measurement error and geographical maps of the area served by the network's cells. The MS location is calculated at the center point of a region determined by the intersection between the serving map and a circular crown defined by the TA. In conjunction with the location estimate, it is also possible to determine a confidence region for the location estimate.

Furthermore, according to the first embodiment, also an implementation of the location algorithm according to the VELOCITA (VEctorial Location with CI-TA) concept has been discussed. In this implementation scheme the location calculation function is executed not in real time and kept separated from the real time delivery of location estimates; resulting in a high-capacity and high-reliability scheme. It is again noted that this concept is also applicable for a WAP location server and possibly other "Stand-Alone SMLC"-servers.

Next, as an appendix to the description of the first embodiment, a more detailed determination of the Constant-TA Circular Crown is described, which can be used in the above-described first embodiment.

Figure 7:
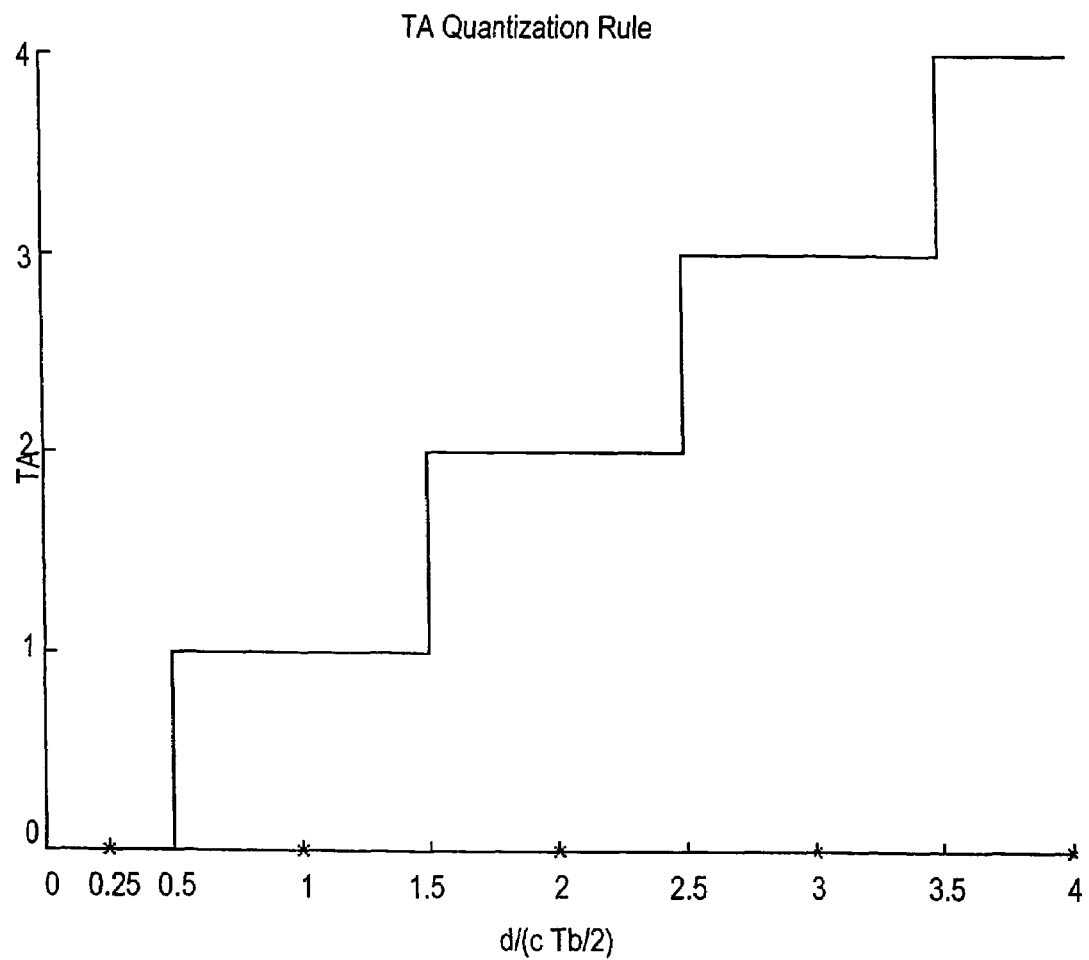
FIG. 7 shows a graphical representation of the TA quantization rule.

As described above, the TA is a measure of the absolute propagation delay between the MS and the serving BTS. If $d_{BTS}$ is the distance between the MS and the serving BTS estimated by the serving BTS, the TA can be expressed according to the GSM specifications as follows:

$$TA = \text{round}\left\{\frac{d_{BTS}}{cT_b/2}\right\}; \quad TA \in [0 \div 63] \qquad (4)$$

wherein $T_b$=3.69 μs is the bit period and $c = 3 \times 10^8$ m/s is the speed of light. The TA is a distance measurement quantized in steps of $cT_b/2 \cong 550$ m. It is used for location purposes to estimate the distance of the MS to be located from the serving BTS. According to the quantization rule (4) represented in FIG. 7, the distance calculated from the TA, $d_{TA}$, is defined as follows:

$$d_{TA} = \begin{cases} \frac{1}{4} \times (cT_b/2) \cong 138 \text{ m} & \text{if } TA = 0 \\ TA \times (cT_b/2) & \text{if } TA > 0 \end{cases}$$

$d_{TA}$ is a measure of radial distance characterized by a measurement error, X:

$$X = d_{TA} - d \qquad (6)$$

where d is the exact distance between MS and serving BTS. There are essentially three contributions in the TA measurement error, X: the condition of Non-Line-Of-Sight (NLOS), the multipath affecting the wave propagation over the radio channel and the granularity error due to the finite measurement's resolution. The combined effect of these contributions can be seen from the typical experimental histogram of X illustrated in FIG. 8.

In the following, the above mentioned errors (i.e., NLOS error, multipath error and granularity error) are described in more detail.

Figure 8:
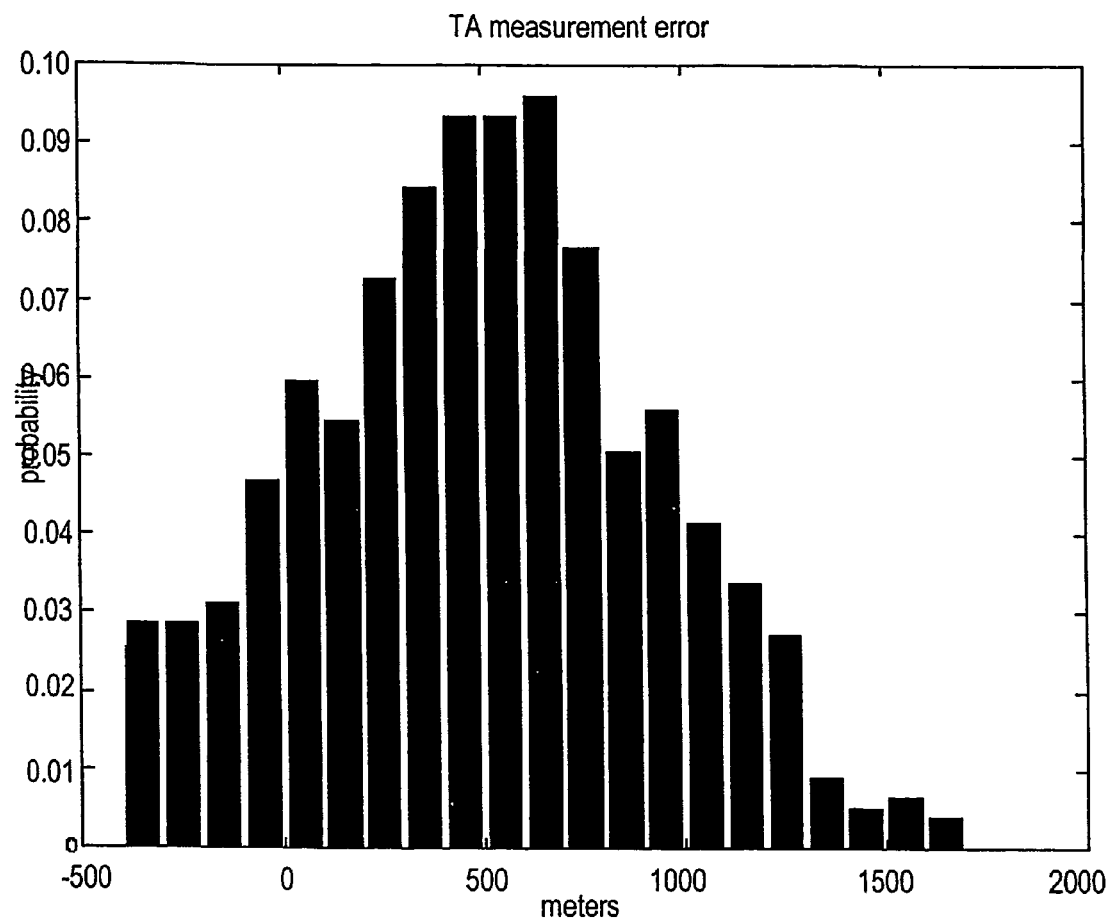
FIG. 8 shows an experimental histogram of the TA measurement error.

The error of NLOS affects directly the estimation of the radial distance, $d_{BTS}$, prior the quantization (see equation (4)), by making the estimate of the radial distance positively biased (i.e., $d_{BTS}$–d is generally positive). The effect of this bias is also present after the quantization, being the mean value of the TA measurement error positive. An example is illustrated in FIG. 8, wherein the mean value, $\mu_x$, is about 500 m.

Analogously as the NLOS contribution, the multipath propagation over the mobile radio channel affects the estimation of the radial distance, $d_{BTS}$. It "spreads" the estimation error, yielding to some hundreds of meters standard deviations in the TA measurement error. In FIG. 8, the standard deviation, $\sigma_x$, is about 450 m.

The granularity error is the effect of the finite TA resolution and is introduced by the "round" operation in equation (4). The granularity increases the variance of the TA measurement error, compared with the variance due to the multipath only. As a result, also the bias introduced by the NLOS error is decreased (e.g., in absence of multipath $d_{BTS}$ would be greater than d due to the NLOS contribution only; but the quantization in (4) can round $d_{BTS}$ to a value smaller than d, making the final TA measurement error negative: $X_{min} \cong -350$ m in FIG. 8.

These considerations must be taken into account when using the TA for location purposes. In particular, the determination of the constant-TA circular crown of FIG. 4 relies on a definition of two radii, $R_1$ and $R_2$, such that with probability the exact distance between MS and serving BTS, d, is within the interval $[R_1; R_1+R_2]$: $R_1$ and $R_1+R_2$ can be calculated once an estimate of the MS-to-BTS distance, $\hat{d}$, and its confidence interval are available. The confidence interval of the distance estimate defines a confidence region in the x-y plane referred to as "constant-TA circular crown, C" in the algorithm according to the first embodiment.

Figure 9:
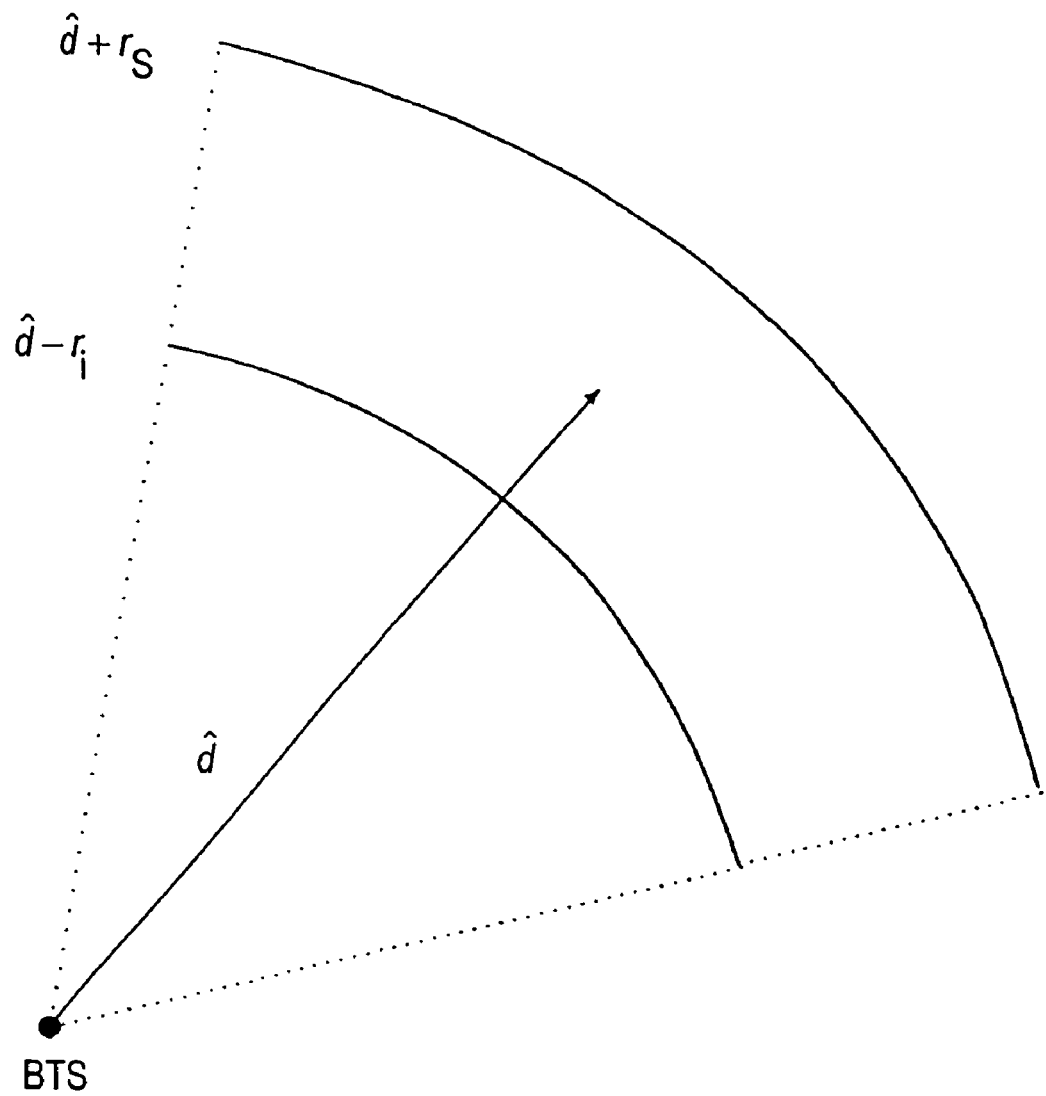
FIG. 9 shows a definition of estimate of distance and confidence interval of the distance estimate.

The confidence region of the distance estimate, which is illustrated in FIG. 9, is a strip around the estimated distance defined by two radii (in general not equal), $r_i>0$ and $r_s>0$ such that the real MS-to-BTS distance, $d$, is in the interval $[\hat{d}-r_i, \hat{d}+r_s]$ in $100\gamma$ % of cases ($\gamma$ is the confidence coefficient).

In the following the procedure to determine $\hat{d}$, $r_i$ and $r_s$ $\hat{d}$ by taking into account the statistical properties of the TA measurement error is outlined: $\hat{d}$ 1. Given the measured TA value, consider the CDF of the TA measurement error for that particular value of TA (see FIG. 10).

2. Calculate distance estimate and confidence interval by using the percentiles of the TA measurement error.

Referring to the simplified CFD in FIG. 10, let $X=d_{TA}-d$ be the random variable defining the TA measurement error, $F(X)$ the CDF of $X$ and $X_p$ the p-th percentile ($0<p<1$) of $X$ (e.g. $X_p$ is such that $F(X_p)=Pr(X \leq X_p)=100p$ %); then distance and confidence interval are determined as described below.

(a) Distance Estimate.

The estimated distance is calculated by adding to the TA measured a correction, $TA_c$, such that the resulting distance estimate $\hat{d}=d_{TA}+TA_c$ is the 50-th percentile (or median value) of the distance:

$$\hat{d}=d_{TA}+TA_c \text{ with } TA_c \text{ such that } Pr(d \leq \hat{d})=50\% \quad (7)$$

By observing that $d=d_{TA}-X$ and $\hat{d}=d_{TA}+TA_c$ the probability of interest becomes $Pr(d \leq \hat{d})=Pr(d_{TA}-X \leq d_{TA}+TA_c)=Pr(-X \leq TA_c)=Pr(X \geq -TA_c)= 1-Pr(X \leq -TA_c)=1-F(X=-TA_c)$ This results in:

$$Pr(d \leq \hat{d}) = 1 - F(X = -TA_c) = 1/2 \quad (8)$$

$$F(X = -TA_c) = 1/2$$

$$\Downarrow$$

$$TA_c = -X_{1/2}$$

where $X_{1/2}$ is the median of the TA measurement error.

(b) Confidence Interval for the Distance Estimate.

Given a confidence coefficient $0<\gamma<1$, the confidence interval associated to the distance estimate, $\hat{d}$, is defined by the radii, $r_i>0$ and $r_s>0$, such that in the $100\gamma$ % of cases the true distance $d$ falls within the interval $[\hat{d}-r_i, \hat{d}+r_s]$. $r_i$ and $r_s$ are calculated by imposing that with equal probability $d$ is inside the intervals $[\hat{d}-r_i, \hat{d}]$ or inside the interval $[\hat{d}, \hat{d}+r_s]$:

$$Pr(\hat{d}-r_1 \leq d \leq \hat{d}+r_s) = \gamma \begin{cases} Pr(\hat{d}-r_i \leq d \leq \hat{d}) = \gamma/2 \\ Pr(\hat{d} \leq d \leq \hat{d}+r_s) = \gamma/2 \end{cases} \quad (9)$$

Again, by observing that $d=d_{TA}-X$ and $\hat{d}=d_{TA}+TA_c$ the, the probabilities of interest become $$\begin{cases} Pr(-TA_c \leq X \leq -TA_c + r_i) = \gamma/2 \\ Pr(-TA_c - r_s \leq X \leq -TA_c) = \gamma/2 \end{cases} \quad (10)$$

Figure 10:
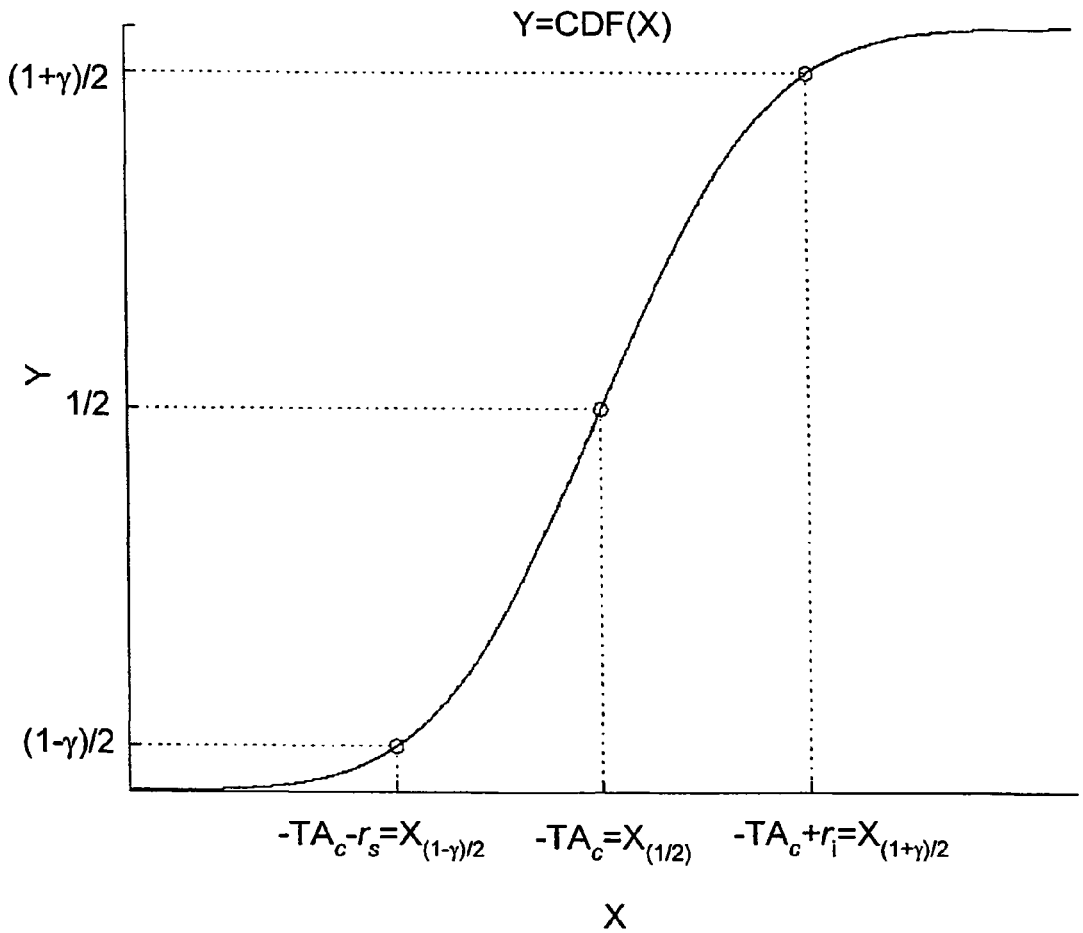
FIG. 10 shows an example of a CDF used as a reference to define the distance estimate.

FIG. 10 helps in writing the probabilities (10) as $$\begin{cases} Pr(-TA_c \leq X \leq -TA_c + r_i) = Pr(X \leq r_i - TA_c) - 1/2 \\ Pr(-TA_c - r_x \leq X \leq -TA) = 1/2 - Pr(X \leq -TA - r_s) \end{cases} \quad (11)$$

By combining equations (10) and (11) $r_i$ and $r_s$ can be determined:

$$\begin{cases} F(X = -TA_c + r_i) = 1/2 + \gamma/2 \\ F(X = -TA_c - r_s) = 1/2 - \gamma/2 \end{cases} \quad (12)$$

$$\Downarrow$$

$$\begin{cases} r_i = TA_c + X_{(1+\gamma)/2} \text{ where } X_{(1+\gamma)/2} \text{ is the } 100\frac{1+\gamma}{2}\sigma/0 \text{ perc. of TA meas. error} \\ r_s = -TA_c - X_{(1-\gamma)/2} \text{ where } X_{(1+\gamma)/2} \text{ is the } 100\frac{1-\gamma}{2}\sigma/0 \text{ perc. of TA meas. error} \end{cases}$$

Considering that $\hat{d}=d_{TA}+TA_c$, $r_i=TA_c+X_{(1+\gamma)/2}$ and $r_s=-TA_c-X_{(1-\gamma)/2}$, the confidence interval can be written equivalently as follows:

$$[\hat{d}-r_i, \hat{d}+r_s] \Leftrightarrow [d_{TA}-X_{(1+\gamma)/2}, d_{TA}-X_{(1-\gamma)/2}] \quad (13)$$

The width of the confidence interval is $$X_{(1+\gamma)/2} - X_{(1-\gamma)/2} \quad (14)$$

Using the notation of equation (2) equation (9) becomes $$Pr(\hat{d}-r_i \leq \hat{d}+r_s)=Pr(R_1 \leq d \leq R_1+R_2)=\gamma \quad (15)$$

where $$R_1=\hat{d}-r_i=d_{TA}-X_{(1+\gamma)/2}; R_2=r_s+r_i=X_{(1+\gamma)/2}-X_{(1-\gamma)/2} \quad (16)$$

Percentile levels of the TA measurement error useful for the calculation of $\hat{d}$ and of its confidence region are listed in table 1.

The procedure to calculate $\hat{d}$ and its confidence region is summarized in the following example, in which the Distance Estimate and its Confidence Interval From a Timing Advance is determined by using the statistical properties of the TA Measurement Error. For exemplification purposes, few simulated percentiles of the TA measurement error (X) are collected in Table 1.

TABLE 1

| TA value | # of samples | 0.5% | 5.0% | 16.5% | 50.0% | 83.5% | 95.0% | 99.5% |
|---|---|---|---|---|---|---|---|---|
| 0 | 70000 | −2492.2 | −175.5 | −313.9 | −8.3 | 45.3 | 69.7 | 127.7 |
| 1 | 70000 | 507.1 | 153.9 | 3.4 | 204.9 | 387.8 | 460.6 | 523.4 |
| 2 | 70000 | 279.9 | 115.5 | 26.8 | 342.3 | 647.9 | 842.2 | 1049.1 |
| 3 | 70000 | 316.9 | 24.7 | 192.2 | 524.0 | 852.9 | 1070.7 | 1302.9 |
| ... | ... | ... | ... | ... | ... | ... | ... | ... |
| 63 | 70000 | 242.4 | 75.0 | 322.8 | 624.4 | 1056.5 | 1345.7 | 1785.1 |

The distance estimate is determined "with the 90% of confidence" ($\gamma=0.9$) when the measured timing advance (TA) is 2.

First, the distance estimate must be calculated as $\hat{d}=d_{TA}+TA_c$. The equivalent in meters of the measured timing advance is $d_{TA} \cong 2 \times 553.8 = 1107$ meters. $TA_c$ is the median value of the TA measurement error when TA=2 (see equation (8)) changed of sign. From table 1, the median value of the TA measurement error when TA=2, is $X_{1/2} \cong 342$ m yielding to a correction of $TA_c = -342$ m and a distance estimate of $$\hat{d} = 1107 - 342 = 765 \text{ m}$$

The percentiles of the TA measurement errors needed to calculate the confidence interval are $100(1-\gamma)/2 = 5\%$ and the $100(1+\gamma)/2 = 95\%$. They can be found in table 1: $X_{(1-\gamma)/2} = X_{5\%} = -115$ m and $X_{(1+\gamma)/2} = X_{95\%} = 842$ m. The extremes of the confidence interval are $d_{TA} - X_{95\%} = 1107 - 842 = 265$ m and $d_{TA} - X_{5\%} = 1107 + 115 = 1222$ m resulting in the confidence interval:

[265;1222] m

As a result of a non-symmetric distribution of the TA measurement error, the distance estimate $\hat{d} = 765$ m is not in the middle of the confidence interval (765−265=500 m; 1222−756=466 m).

Next, as a further appendix to the first embodiment, a procedure for calculating the Center Point and Its Confidence Region is described. In particular, the location of the MS is estimated as the center point of the region $I = S \cap C$, i.e., the center point of the intersection area of the serving area and the constant-TA crown, as defined above.

The procedure requires the following input:

The region I can be considered as being defined through a bitmap of pixels in an arbitrary x-y Cartesian system:

$$I: \{x_m, y_n\}; m=1, \ldots, M \ n=1, \ldots, N \quad (17)$$

Coordinates of the serving BTS: $x_s, y_s$

The center point of I has coordinates ($x_{CP}; y_{CP}$) which are calculated as follows.

1. Conversion of the pixels coordinates in a polar coordinates: $(x_m, y_n) \rightarrow (\rho_{mn}, \theta_{mn})$.

Figure 11:
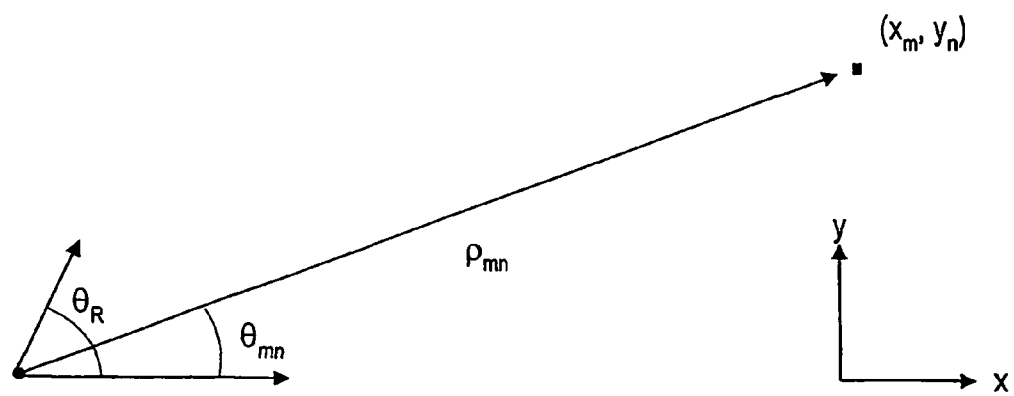
FIG. 11 shows an example for the polar reference system.

The polar reference system $(\rho, \theta)$ is originated in the serving BTS of coordinates $(x_s, y_s)$. $\rho_{mn}$ is the distance between the pixel of coordinates $(x_m, y_n)$ and the serving BTS. $\theta_{mn}$ is the angle associated to the same pixel measured counter-clockwise from the x axis (refer to FIG. 11).

$$\rho_{mn} = \sqrt{(x_x - x_m)^2 + (y_x - y_n)^2} \; ; \; \theta_{mn} = \tan^{-1} \frac{y_s - y_n}{x_x - x_m} \quad (18)$$

2. Determination of the deviation of the pixels's angular coordinates $\theta_{mn}$ from a given reference angle, $\theta_R$. The deviation is indicated in the following with $\delta_{mn}$.

The reference direction $\theta_R$ provides an indication of the serving sector's bearing. If the BTS antenna bearing is available then $\theta_R$ should assume that value. If the exact information on the antenna is not available, a suitable definition for $\theta_R$ is the median value of a plurality of angles $\theta_{mn}$'s:

$$\theta_R = \text{median}\{\theta_{mn}\} \quad (19)$$

The deviation of the pixels's angular coordinates from $\theta_R$ is simply defined as (see FIG. 11):

$$\delta_{mn} = \theta_{mn} - \theta_R \quad (20)$$

3. Determination of the radial coordinate and angular deviation of the center point: $(\rho_{CP}; \delta_{CP})$ The radial coordinate of the center point and its angular deviation from the reference direction $\theta_R$ can be determined as the median value of $\rho_{mn}$'s and $\theta_{mn}$'s respectively:

$$\rho_{CP} = \text{median}\{\rho_{mn}\}; \; \delta_{CP} = \text{median}\{\delta_{mn}\} \quad (21)$$

4. Conversion of polar coordinates of the center point in x-y coordinates: $(x_{CP}, y_{CP})$.

The center point's orientation in the $(\rho, \theta)$ reference system is calculated according to equation (20):

$$\theta_{CP} = \delta_{CP} + \theta_R \quad (22)$$

The x-y coordinates of the center point are calculated according to the definition (18):

$$x_{CP} = x_s + \rho_{CP} \cos(\theta_{CP}); \; y_{CP} = y_s + \rho_{CP} \sin(\theta_{CP}) \quad (23)$$

Figure 12:
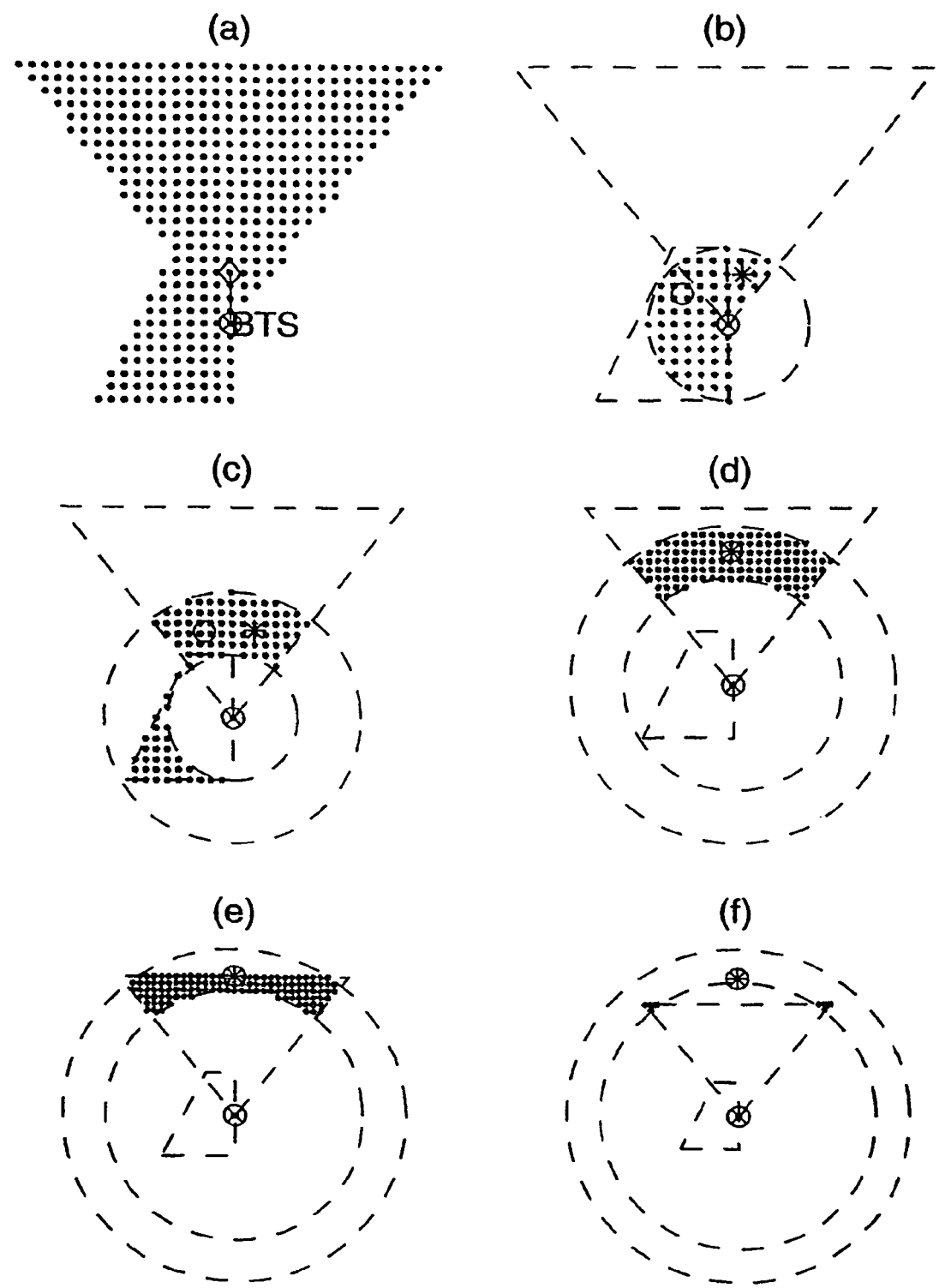
FIG. 12 shows an application of the algorithm according to the first embodiment to determine the center point of the cell.

Next, an example of Center Point Calculation is given:

Results obtained with the algorithm proposed above are provided in FIG. 12. A simple serving cell is defined by the union of a triangle and a trapezium (FIG. 12a). The BTS site is located at the origin of an arbitrary x-y reference system. The BTS antenna bearing measured with the same convention as $\theta$ is 90° but, for illustration purposes, its value is assumed unknown and the reference angle is calculated according to equation (19).

In FIGS. 14b-12f the dots represent the pixels inside the region I for different Timing Advance values (the dimensional unit is arbitrary). The center point is calculated according to the procedure described by equations (18)-(23). Its location is represented by the circle within the region of the dots in each of the FIGS. 14b to 14f, respectively. The need of a reference direction $\theta_R$ is stressed by providing the results obtained without using any information on the "cell orientation", i.e. by assuming $\theta_R = 0$ (the location of the center point in this case is represented by an asterisks in the Figs.).

If a reference direction is not used (i.e., if $\theta_R=0$) $\theta_{CP}=\delta_{CP}$ is simply the median value of the $\theta_{mn}$'s. In the example examined angles are measured with the convention $-\pi \leq \theta_{mn} \leq -\pi$. Thus in the case of FIG. 12b, for instance, the pixels with $-\pi \leq \theta_{mn} \leq -\pi/2$ and the pixels with $\pi/2 \leq \theta_{mn} \leq \pi$ cancel out and only the pixels with $0 \leq \theta_{mn} \leq \pi/2$ determine the (wrong) direction of the center point.

Determination of the Confidence Region

The confidence region R should be determined from the following definition (for simplicity continuous random variables are used instead of $\rho_{mn}$ and $\theta_{mn}$):

$$Pr((\rho, \delta) \in R) = \int\int_R f_{\rho\delta}(\rho, \delta) d\rho d\delta = \xi \quad (24)$$

being $\xi$ the required confidence coefficient and $f_{\rho\delta}(\rho,\delta)$ the joint probability density function (PDF) of the pixels' radial coordinate and angular deviation from $\theta_R$.

To derive $f_{\rho\delta}(\rho,\delta)$ can be very complicated if not impossible. Thus, the PDF can be approximated in order to determine R. For such an approximated procedure, it is assumed that $\delta$ and $\rho$ are independent random variables. Under such an assumption $f_{\rho\delta}(\rho,\delta)$ is the product of the marginal distributions $f_\rho(\rho)$, $f_\delta(\delta)$ and the definition (24) simplifies as follows:

$$Pr((\rho, \delta) \in R) \cong \int\int_R f_\rho(\rho) f_\delta(\delta) d\rho d\delta = \xi \quad (25)$$

Since the center point is determined from the region I, intersection of the serving area S and the constant-TA circular crown C, it is convenient to determine the confidence region R as a subregion of C. The radial borders of R are the same as C; the angular width is determined by using the angular distribution of pixels in I.

C can be expressed in $(\rho, \delta)$ coordinates as:

$$C: \{(\rho,\delta): R_1 \leq \rho \leq R_1+R_2; 0 \leq \delta < 2\pi\} \quad (26)$$

and it is such that $$Pr(R1 \leq \rho \leq R1+R2; 0 \leq \delta < 2\pi) = \int_{R1}^{R1+R2} f_\rho(\rho) d\rho \int_0^{2\pi} f_\delta(\delta) d\delta = \int_{R1}^{R1+R2} f_\rho(\rho) d\rho = \gamma \quad (27)$$

It is then possible to define the confidence region R in $(\rho, \delta)$ coordinates as $$C: \{(\rho,\delta): R_1 \leq \rho \leq R_1+R_2; \delta_1 \leq \delta \leq \delta_2\} \quad (28)$$

where $\delta_1$ and $\delta_2$ can be obtained from (25) after substitution of (27):

$$Pr(\delta_1 \leq \delta \leq \delta_2) = \int_{\delta_1}^{\delta_2} f_\delta(\delta) d\delta = \xi/\gamma \quad (29)$$

R so defined has the shape of a circular crown with same origin and radial bounds as C but different angular width.

In absence of other information $f_\rho(\rho)$ can be approximated with the distribution of $\delta_{mn}$'s determined in equation (20) and $\delta_1$, $\delta_2$ calculated as the $(1-\xi/\gamma)/2$-th, $(1+\xi/\gamma)/2$-th percentile levels respectively:

$$Pr(\delta 1 \leq \delta \leq \delta 2) = \xi/\gamma \begin{cases} Pr(\delta \leq \delta_1) = (1-\xi/\gamma)/2 \\ PR(\delta \leq \delta 2) = (1+\xi/\gamma)/2 \end{cases} \quad (30)$$

The discussion above is the background for the procedure to determine the confidence area of the location estimate, which is summarized in the following:

Input

Required confidence coefficient for the location estimate: $\xi$

Confidence coefficient associated to the constant-TA circular crown: $\gamma$

Distribution of the angular deviations: $\{\delta_{mn}\}$

It is noted that for the above coefficients, it must be $0<\xi<\delta<1$.

Figure 13:
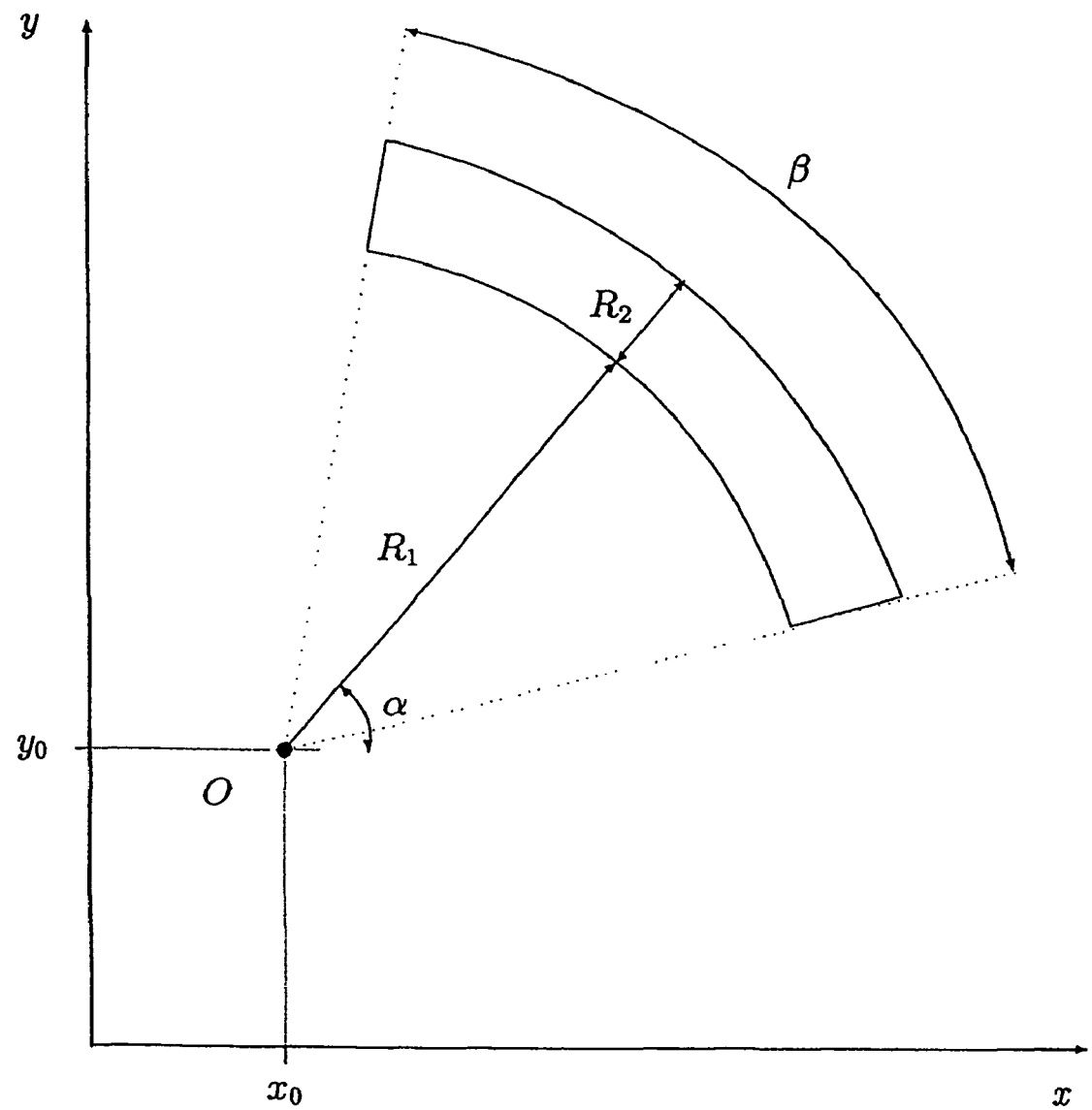
FIG. 13 shows the confidence region of the location estimate.

The confidence region of the center point is represented in FIG. 13 and characterized by the following parameters:

origin located at point with coordinates $(x_0; y_0)$ inner radius, $R_1$ uncertainty radius, $R_2$ inclusion angle defining the width of the sector, $\beta$ orientation angle measured counterclockwise from x axis, $\alpha$ The confidence region's parameters are derived as described in the following.

1. Sort the $\delta_{mn}$'s:

$$\{\delta_l\}_{l=1}^{M \times N} = \text{sort} \{\delta_{mn}\} \quad (31)$$

2. Determine $\delta_1$ and $\delta_2$ $\delta_1$ and $\delta_2$ are the $(1-4/\gamma)/2$-th and $(1+\xi/\gamma)/2$-th percentile levels of the $\delta_1$'s:

$$\delta_1 = \delta_1|_{l=\left\lfloor (M \times N)\left(\frac{1-\xi/\gamma}{2}\right)\right\rfloor} \quad (32)$$

$$\delta 2 = \delta_1|_{l=\left\lceil (M \times N)\left(\frac{1+\xi/\gamma}{2}\right)\right\rceil} \quad (33)$$

where $\lfloor \cdot \rfloor$ rounds • to the nearest integer towards minus infinity (floor operation) and $\lceil \cdot \rceil$ rounds • to the nearest integer towards infinity (ceil operation).

3. Determine the angular width of the confidence region: $\beta$.

$\beta$ is the total angular width spanned by $\delta_1$ and $\delta_2$. Assuming for simplicity, $0 \leq \delta_1, \delta_2 < 2\pi$, it results $$\beta = \delta_2 - \delta_1 \quad (34)$$

4. Determine the orientation of the confidence region: α.

α is the angle measured in the (ρ, θ) system corresponding to the smallest angular deviation, $\delta_1$:

$$\alpha = \theta_R + \delta_1 \qquad (35)$$

5. Determine the origin of the confidence region: $(x_0, y_0)$.

The confidence region has origin in the serving BTS coordinates:

$$x_0 = x_S$$

$$y_0 = y_S \qquad (36)$$

6. Determine inner radius and uncertainty radius: $R_1$, $R_2$.

R1 and R2 are the same radii that characterize the constant-TA circular crown C, as shown in FIG. 4 and used in equations (1) to (3).

Second Embodiment

According to the first embodiment, the procedure to locate Mobile Stations (MS's) uses Cell Identity (CI), Timing Advance (TA), radio coverage data and statistical models for the TA measurement. The procedure according to the first embodiment uses only information related with the serving Base Transceiver Station (BTS).

However, according to the second embodiment described in the following, an extension of the procedure of the first embodiment is used, which includes in the location calculation the hearability area of neighbor BTS's measured by the MS to be located.

According to the first embodiment, the location algorithm is also implemented according to the VELOCITA (VEctorial LOcation with CI-TA) concept. The extension proposed in this embodiment can also be used in such implementation.

According to the second embodiment, the hearability area of the neighbor BTS's is in particular used. In this context, such areas designate the geographical locations where the broadcast signal radiated from a certain BTS can be received with a level that is above the sensitivity level of the handset. Hearability areas can be retrieved from the same network planning system that supports the implementation of the location procedure according to the first embodiment. In the GSM system, the identity of the neighbor BTS's which the MS is measuring can be obtained from the measurement reports (layer 3 messages) sent by the MS to the serving BTS. Such messages include, among other information, BSIC (Base Station Identity Code), BCCH carrier number and signal strength (RXLEV) measured by the MS on the BCCH frequency of the neighbor BTS's.

The location procedure according to the first embodiment can be extended by assuming that the following information is available:

Input:
Cell Identity of the serving BTS: CI
Timing Advance from the serving BTS: TA
Confidence coefficient for the Timing Advance measurement: γ
Confidence coefficient for the location estimate: ξ
Identity of the N neighbour BTS's measured by the MS: $\{NI_1, \ldots, NI_N\}$.

In addition, the neighbor BTS's may be ordered in order of level intensity, i.e. $NI_1$ is the BTS with the highest received level and NIN is the BTS with the lowest received level. In practise, each of the identiy codes $\{NI_1, \ldots, NI_N\}$ is made of a pair BSIC (Base Station Identity Code)+Carrier decoded by the MS when measuring. the BCCH frequency of neighbor BTS's.

Additional Information available:
BTS coordinates
Serving cell maps
Percentile levels of the TA measurement error
Hearability areas of the neighbor BTS's measured by the MS: $\{H_1, \ldots, H_N\}$.

The hearability area $H_i$ of the i-th neighbor BTS identified by the identity code $NI_i$ can be defined as follows:

$$H_i : \{(x,y) \in IR^2 : RXLEV_i(x,y) \leq p\} \qquad (37)$$

where $RXLEV_i(x, y)$ is the signal strength measured by the MS on the BCCH (Broadcast Common Control Channel) frequency of the i-th BTS and p is the sensitivity level of the MS.

The output of the algorithm is
Output:
Estimate of the MS location: $\hat{x}, \hat{y}$
Confidence region of the location estimate The first three steps of the location algorithm are the same as in the first embodiment, but the fourth step includes the location information derived from $\{H_1, \ldots, H_N\}$.

1. Select the coordinates of the serving BTS using the CI: $x_S, y_S$

2. Select the serving cell map: S

3. Determine the parameters of the constant-TA circular crown, C:

$$C : \left\{(x, y) \in IR^2 : R_1 \leq \sqrt{(x-x_o)^2 + (y-y_o)^2} \leq R_1 + R_2\right\} \qquad (1)$$

$$\begin{cases} \text{Origin: } x_0 = x_s; & y_0 = y_s \\ \text{Radii: } R_1 = d_{TA} - X_{(1+\gamma)/2}; & R_2 = X_{(1+\gamma)/2} - X_{(1-\gamma)/2} \end{cases}$$

where $$d_{TA} = \begin{cases} \frac{1}{4} \times (cT_b/2) \cong 138 \text{ m} & \text{if } TA = 0 \\ TA \times (cT_b/2) & \text{if } TA > 0 \end{cases}$$

and $X_{(1+\gamma)/2}$ is the $$100 \frac{1 \pm \gamma}{2} \%$$

percentile of the TA measurement error.

4. Estimate the MS location and its confidence region from the region:

$$I = S \cap C \cap \bigcap_{i=1}^{N} H_i$$

The serving cell map S includes all the possible locations of a MS in communication with the cell identified by the CI.

The constant-TA circular crown C includes the possible locations of a MS which uses the given TA while connected or attached with the BTS identified by the CI.

The hearability areas $H_i$ (i=1, ..., N) define the geographical regions where the BCCH frequencies radiated by the BTS's identified by $NI_i$ (i=1, ..., N) reach the handsets with a signal strength that is above the MS sensitivity level.

The MS location is thus included in the intersection I between S, C and $H_1$, ..., $H_N$. For generality, all the N neighbor BTS's are considered in the algorithm. However the procedure can also use only a subset of neigbor BTS's. Moreover, the neighbor BTS's can be ordered according to the received signal strength.

Figure 14:
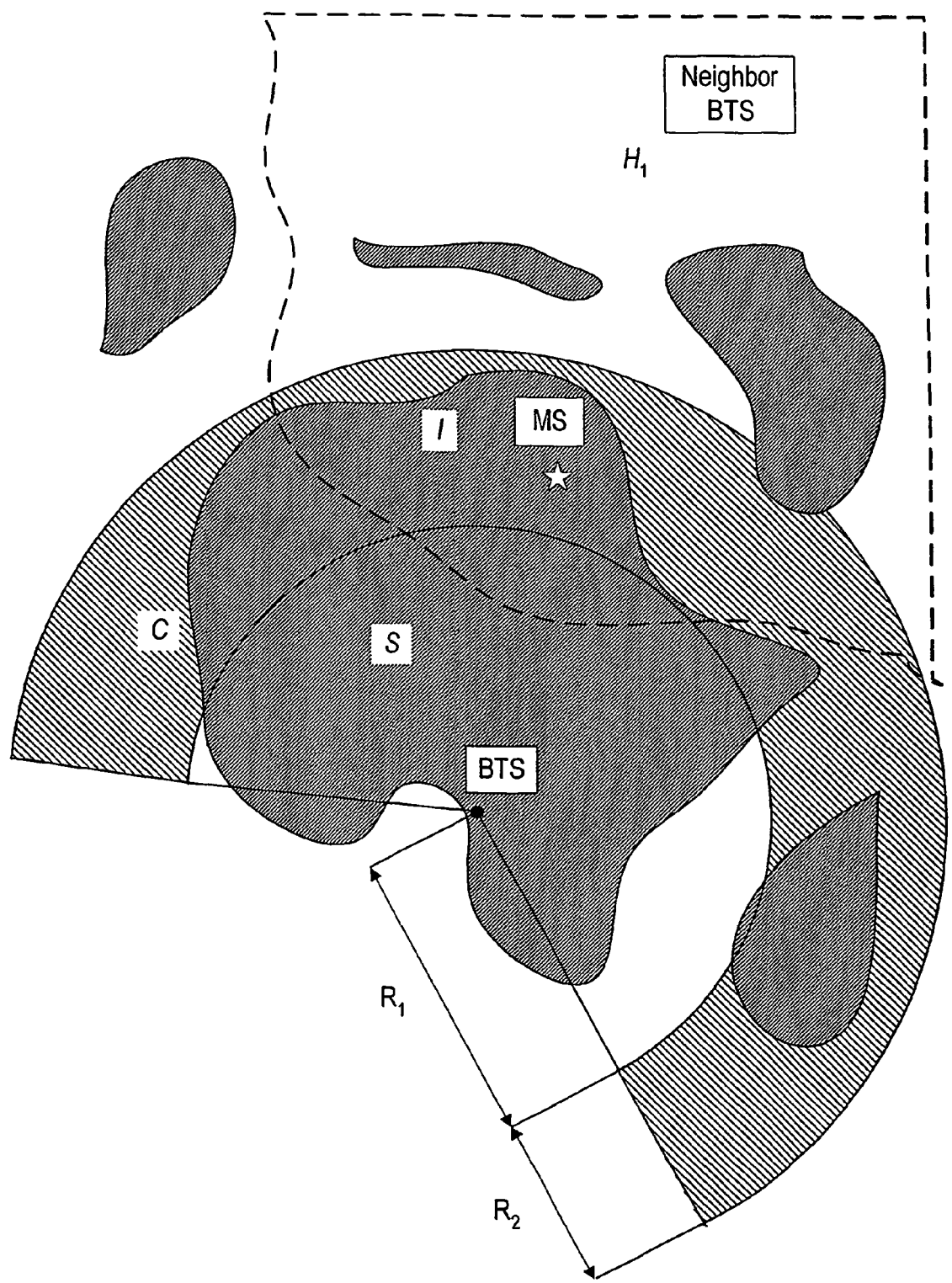
FIG. 14 shows an MS location estimated at the center point of the intersection between serving area (S), constant-TA circular crown (C) and hearability area of the first neighbor BTS ($H_1$) according to a second embodiment.

FIG. 14, for example, represents a case where I is determined by the intersection between the serving area S, the constant-TA circular crown C and the hearability area $H_1$ (illustrated by the sketched line) of the first neighbor BTS only.

The MS location $(\hat{x},\hat{y})$ and the confidence region R (such that the MS is inside R with probability $\xi$) can be determined with the same algorithm according to first embodiment.

It is noted that in GSM, the number of neighbor cells is six. However, in order to limit the complexity, it is advantageous to keep N low (e.g., N=1÷2). In this manner, only the most relevant information is used. For example, only the one or two neighbor BTS's may be used which have the highest signal strength.

Thus, the use of hearability area of neighbor BTS's according to the second embodiment improves the location accuracy by reducing the size of the uncertainty area where the MS can be located.

Furthermore, the introduction of hearability areas in a location algorithm originally conceived as a CI-TA procedure allows to use valuable coverage information of neighbor BTS's.

Moreover, the implementation of the location procedure according to the VELOCITA concept (i.e., location calculation performed not in real time as according to the first embodiment) is still possible if additional memory is used to store the location estimate tables generated in the LMT. On the other hand, if RXLEV measurements were used, real time location calculation would be necessary.

In addition, the need for real time calculation power is minimal. That is, as in the case of the first embodiment, most calculations can be performed beforehand and can be stored in a database (look-up table), such that the corresponding values can be retrieved from the database instead of calculating in real-time. Hence, the above procedure according to the second embodiment is suitable for mass locating, i.e., for locating a large number of users.

As a modification of the above described second embodiment, a location estimate can also be determined based only on the hearability areas. That is, an intersection area is formed from all hearability areas which can be received by the mobile station. In this way, it is not necessary to also detect the constant-TA crown and the map of the cell. In case a sufficient high number of surrounding BTS is present, an suitable accurate location estimate can be obtained.

Third Embodiment

In the following, a third embodiment is described in which Cell Identity (CI), Timing Advance (TA) and strength of received Signals with radio coverage information are used to locate mobile stations.

In the GSM system, the identity of the i-th neighbor BTS, $NI_i$, used in the second embodiment can be obtained in practice from the pair of parameters BSIC (Base Station Identity Code)+BCCH Carrier included by the MS in the normal measurement reports (layer 3 messages) sent to the serving BTS.

Measurement reports include, among other information, also the signal strength (RXLEV) measured by the MS on the BCCH frequency of the neighbor BTS's. This information can be used to refine further the procedure according to the second embodiment, in the sense that the contribution of the neighbor cells in the location calculation can be extended to include, beside the identity of neighbor cells (i.e. hearability areas), also the actual strength of signals measured by the MS.

The basic idea of the procedure proposed in this document is to determine the region I as intersection of
1. Serving area, S.
2. Constant-TA circular crown, C.
3. Coverage areas of the N neighbour BTS'S, $\{N_1, ..., N_N\}$.

The coverage area of the i-th neighbour, $N_i$, identifies the geographical region where the broadcast channel radiated by the BTS identified by the i-th "identity code", $NI_i$, reaches the MS with a signal strength that is the one measured by the MS.

The coverage area of the i-th neighbor BTS $N_i$ when the MS measures a signal strength of $RXLEV_i^{(m)}$ can be defined as follows:

$$N_i(RXLEV_i^{(m)}): \{(x,y) \in IR^2 : RXLEV_i^{(p)}(x,y) \leq RXLEV_i^{(m)} + \Delta_i\} \quad (39)$$

where $RXLEV_i^{(p)}$ is the signal strength predicted for the BCCH frequency of the i-th BTS when the MS is at the location of coordinates (x, y) and $\Delta_i > 0$. $\Delta_i$ takes into account the fluctuations which usually affect RXLEV measurements. A reasonable value for $\Delta_i$ could be 6÷10 dB.

In alternative to the coverage area defined in (38) a coverage crown can be used to determine I.

Such a region is defined by using an interval of extremes $RXLEV_i^{(m)} \pm \Delta_i$ instead of $RXLEV_i^{(m)} + \Delta_i$:

$$N_i(RXLEV_i^{(m)}): \{(x,y) \in IR^2 : RXLEV_i^{(m)} - \Delta_i \leq RXLEV_i^{(p)}(x,y) \leq RXLEV_i^{(m)} + \Delta_i\} \quad (39)$$

In equation (39), the fluctuations affecting the measured RXLEV are accounted for, as in equation (38), but regions where the predicted RXLEV is much higher than the actual measured level are excluded from I.

The hearability area is a coverage area defined as in equation (38) when $RXLEV_i^{(m)} + \Delta_i$ is equal to the MS sensitivity level. Since in general, the further the MS is from the BTS, the lower the signal strength is, the herability area for a certain BTS include all coverage areas (crowns) defined for measured RXLEVs higher than the MS sensitivity level. For this reason, the coverage area (crown) of a certain BTS is in general less extended than its herability area; thus the region I determined from coverage areas (crowns) is in general smaller than the one calculated by using hearability areas. As final result the location accuracy improves.

The location calculation can be carried out exactly as described in the second embodiment, after substituting the hearability areas $H_i$'s with the coverage areas (crowns) defined in equation (38) or (39).

The location calculation based on RXLEVs (the hearability area of a certain BTS is in practice one special coverage area) according to the third embodiment can also be implemented in the VELOCITA framework described in the first embodiment. It has to be noted that the location tables grow in size. This is because the MS measures up to six RXLEVs ranging from −48 dBm to −110 dBm with a resolution of 1 dBm. This means that if coverage areas (crowns) for all possible cells in the network and for all possible RXLEVs were used, the size of location tables generated in the VELOCITA framework would have to be large. In practice however there is no need to consider neither all the measured neighbors nor all possible RXLEV values; in fact, the growth in terms of size of the data structure would not be paid back by a comparable increase in location accuracy. For this reason, in a practical implementation, few neighbors (e.g., N=1÷2) and few values of RXLEV (e.g., −90 dBm, −80 dBm, −70 dBm, depending on the average signal level in the area considered) could be considered.

In a practical implementation, the planning tool (.e., the LMT) can supply (for a given cell) several coverage areas with different signal levels, e.g., one at −70 dBm, one at −80 dBm, one at −90 dBm and one at the sensitivity level −100 dBm (i.e., the hearability area).

Figure 15:
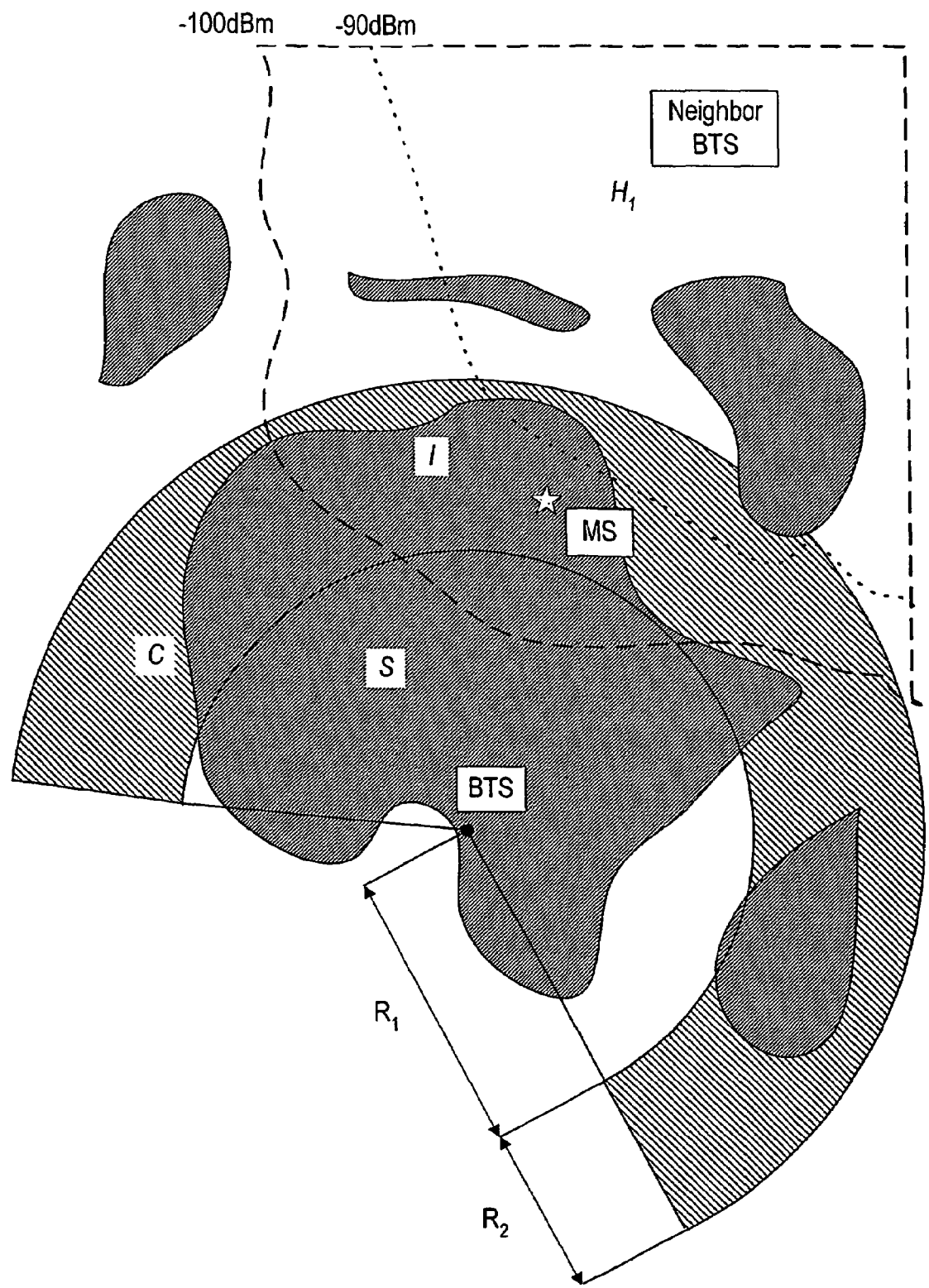
FIG. 15 shows an MS location estimated at the center point of the intersection area as in FIG. 14, wherein in addition coverage areas with different signal levels are considered, according to a third embodiment.

This is illustrated in FIG. 15. In contrast to FIG. 14, here not only the hearablity area of the first neighbor BTS is shown, but also coverage areas with different signal levels, namely −100 dBm (respresented by the sketched line) and −90 dBm (represented by the dotted line). As derivable from FIG. 15, the estimated location is between the −90 dBm and the −100 dBm lines. That is, the intersection area I, and therefore the uncertainty, is smaller.

Thus, by the procedure according to the third embodiment, i.e., the use of neighbor's coverage areas (crowns), the location accuracy is improved, because the size of the uncertainty area where the MS can be located is reduced.

Furthermore, the implementation of the location procedure according to the VELOCITA concept (i.e., location calculation performed not in real time) is possible if additional memory is used to store the location estimate tables generated in the LMT.

Hence, the need for real time calculation power is minimal and thus, the procedure according to the third embodiment is suitable for locating a huge number of mobile stations.

The third embodiment can be modified similar to the modification of the above described second embodiment. That is, a location estimate can also be determined based only on the hearability areas. That is, an intersection area is formed from all hearability areas which can be received by the mobile station. In this way, it is not necessary to also detect the constant-TA crown and the map of the cell. In case a sufficient high number of surrounding BTS is present, an suitable accurate location estimate can be obtained, in particular when considering different signal levels.

Fourth Embodiment

As already described above, the distance between the mobile station and the serving base station BTS can be estimated by the Timing Advance (TA):

$$d \cong TA \times (cT_b/2) \quad (40)$$

where $T_b$=3.69 μs is the bit period, c=3×10$^8$ m/s is the speed of light, and TA is an integer ranging from 0 to 63.

Figure 16:
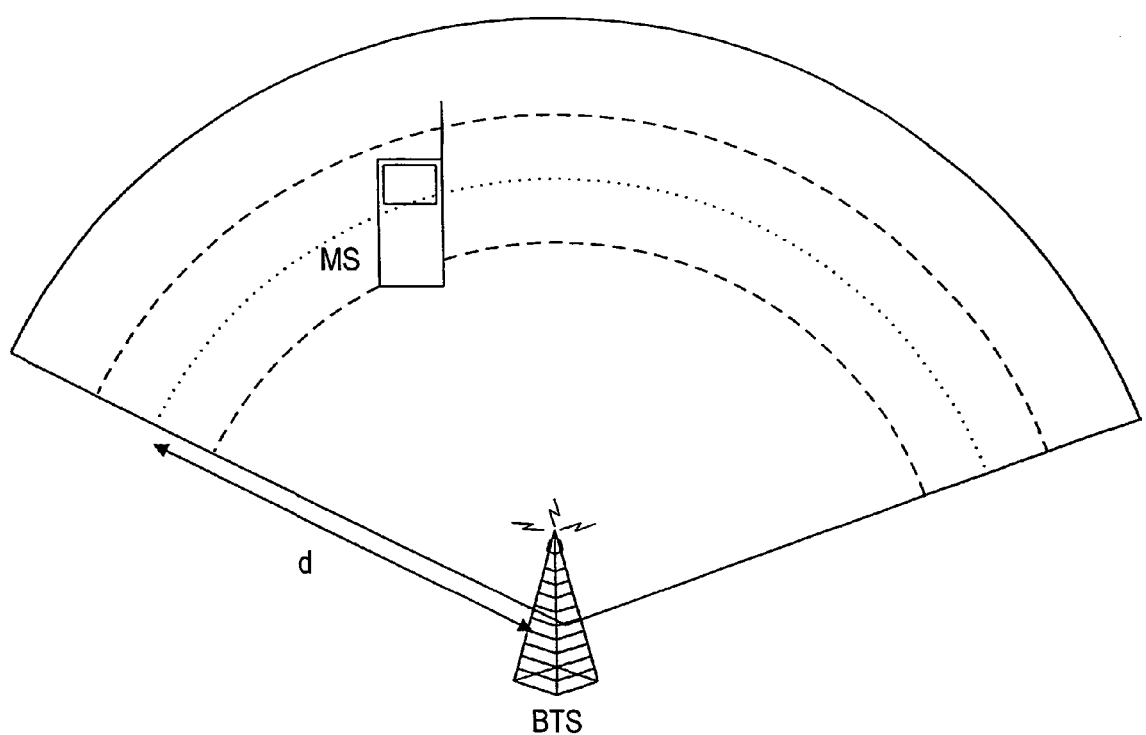
FIG. 16 shows a location estimate using CI and TA.

According to the fourth embodiment, it is also taken into account that cells may be sectored. Using the Cell Identity (CI), the sector of the serving cell can be determined. Using TA the distance d can be estimated. Combining these two, an arc can be determined inside which the mobile station should be located. The location estimate can be e.g. the mass center of the arc, as illustrated in FIG. 16.

Figure 17:
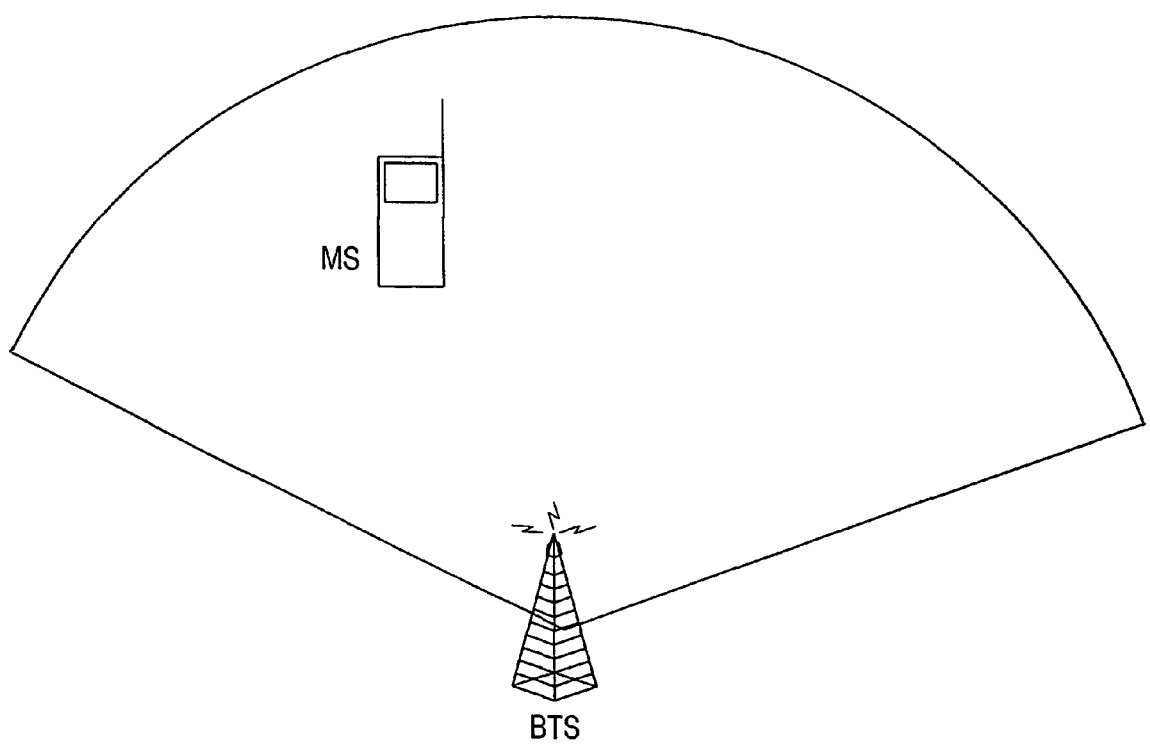
FIG. 17 shows a location estimate using CI only.

In the case when only CI is known (no TA), the location estimate can be just the mass center of the whole cell (see FIG. 17). When the cell is omnidirectional, the best guess would be just the serving base station coordinates.

When CI and TA are used for location, the location accuracy is limited by the sector angular width and distance estimation reliability. In GSM the resolution of TA is 1 bit, which means that the distance d can be estimated with the resolution of 550 meters. In practice this means that CI+TA location accuracy varies with cell size, and is generally not very good.

According to the fourth embodiment, the location accuracy with CI or CI+TA procedure is improved by using external information about the probability density of mobile subscriber locations is used. In other words, when the location estimate is calculated from a coverage area of a cell (CI) or from an arc (CI+TA), this location estimate is calculated as a weighted mass center of the cell, i.e., the coverage area of the cell. The weights for each point reflect the probability of a subscriber being there.

Figure 18:
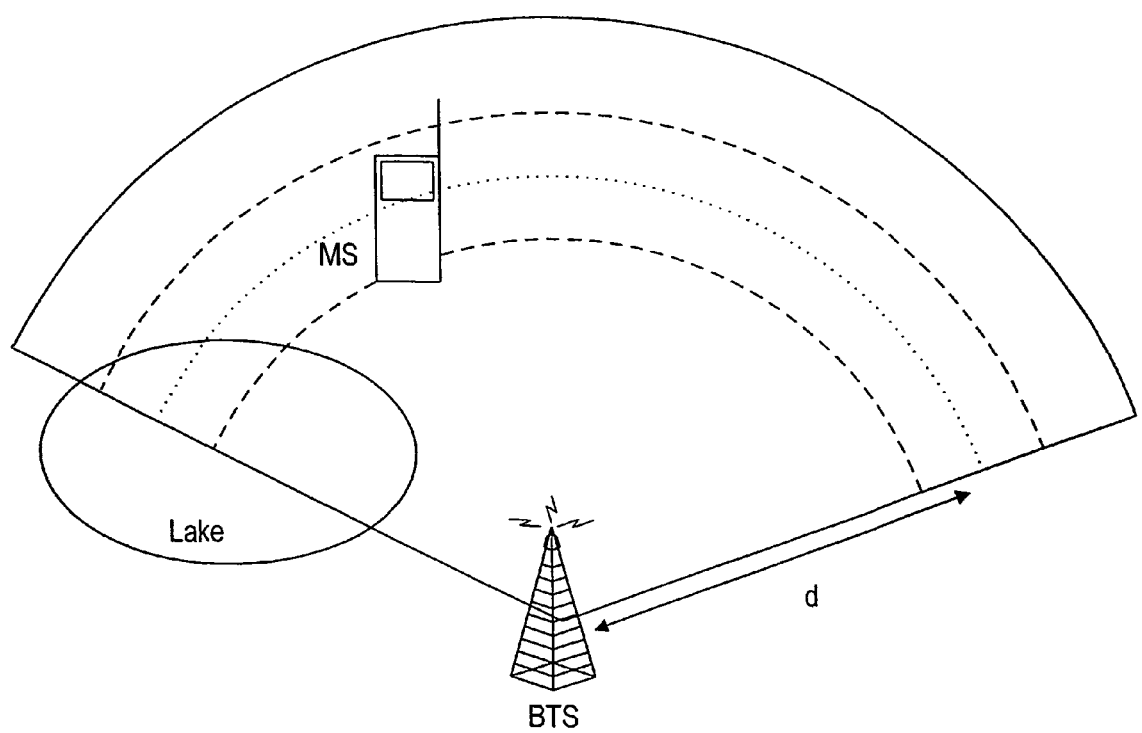
FIG. 18 shows a location estimate using geographical information to determine the distribution of users according to a fourth embodiment.
Figure 19:
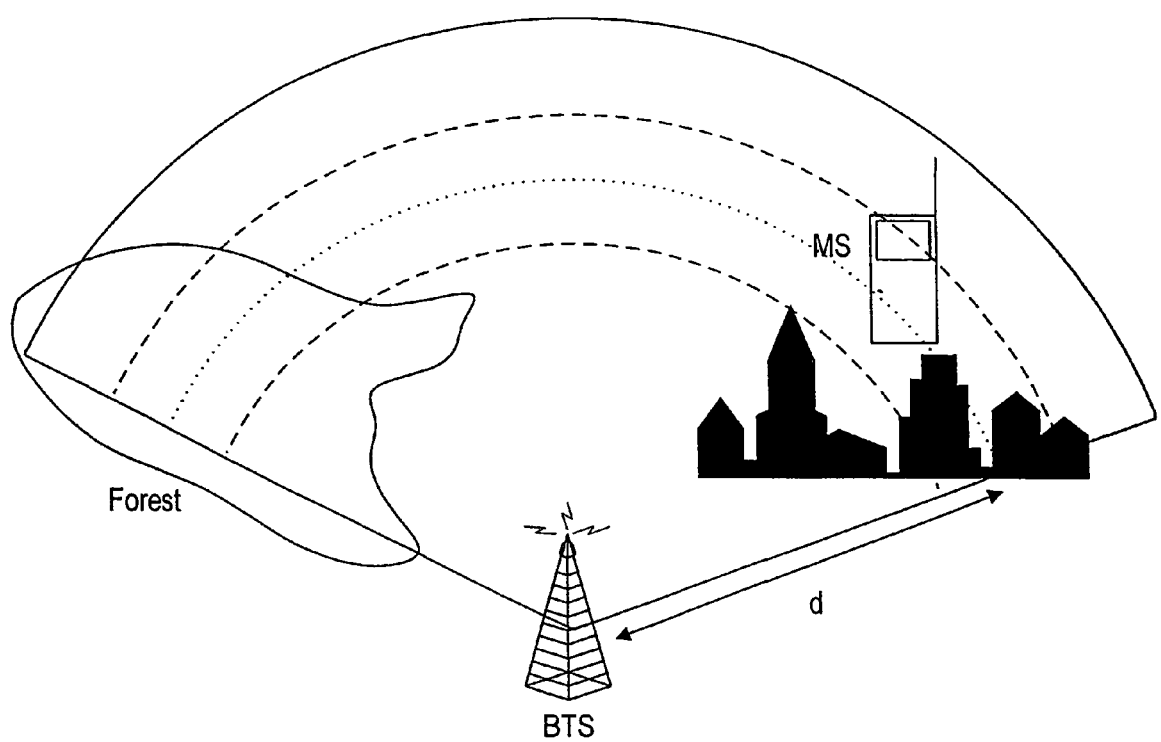
FIG. 19 shows a location estimate using information on the population density to determine the distribution of users according to the fourth embodiment.
Figure 20:
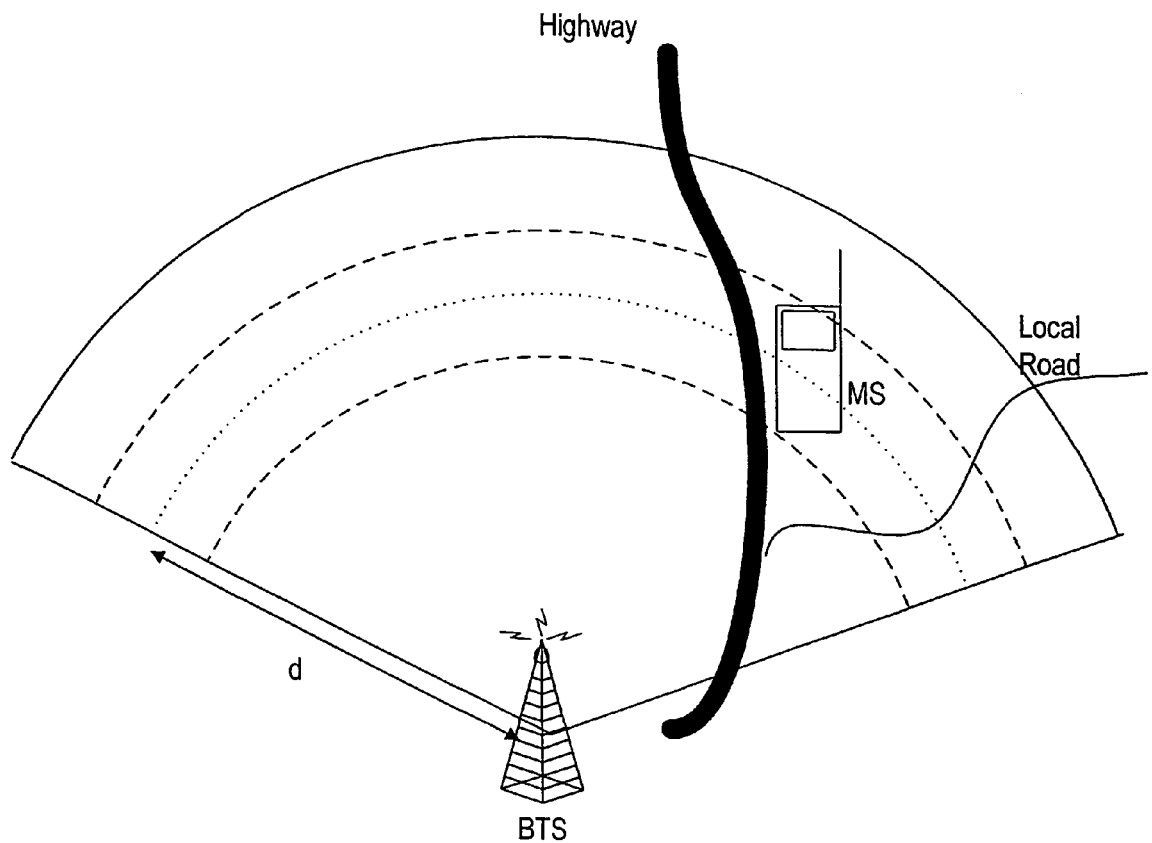
FIG. 20 shows a location estimate using information on traffic density to determine the distribution of users according to the fourth embodiment.

Some possible sources for the user density distribution are:
  Empirical user density studies, e.g. with some other location procedures more exact distribution of mobile users has been measured. For example, in standardized GSM location systems the Serving Mobile Location Center (SMLC) can collect statistics of location estimates obtained using more accurate GPS and E-OTD procedures. Such statistics can be used to form periodically the probability density of users inside each cell.
  Geographical information is used. For example some part of the cell coverage area might be sea or a lake, where it is less likely that a user is situated (see FIG. 18).
  Information about population density (e.g. offices, apartment buildings). An example is shown in FIG. 19. In this example, the probability that a user is located in the suburb on the right side of the cell is much higher than in the forest on the left side.
  Information about roads, traffic densities, etc. This is illustrated in FIG. 20. Here, the probability that a user is located on the highway is very high, whereas the probability that he is located on a local road or in regions without roads (as on the left side) is rather low.

It is noted that the above information may change with time. That is, in particular the population density may change, such that the above information should be updated from time to time. This can be done as a non-real time process such that this will not decrease the location capacity.

By the above described procedure according to the fourth embodiment, the accuracy is improved. Furthermore, the implementation can be done using only software, such that no costly new hardware is required. In particular, no amendments to the mobile stations are required. That is, since the CI+TA procedure can be applied to existing mobiles, also the proposed improvement is applicable to all mobiles.

In the following, the mathematical formulation of the Location Algorithms according to the fourth embodiment is given.

Firstly, background information for the location algorithms according to the fourth embodiment are provided. More details can be found in A. Papoulis: "Probability, Random Variables, and Stochastic Processes" ($3^{rd}$ Ed., McGraw-Hill, 1991).

The most simple way to state a parameter estimation problem is the following: we wish to estimates the value of a random variable Y by means of a constant c, which minimizes the Average Risk AR defined as follows:

$$AR = E\{L(Y-c)\} \tag{41}$$

L(x) is called Loss Function. After introducing the probability density function of Y, $f_y(y)$, AR can be expressed as follows:

$$AR = E\{L(Y-c)\} = \int_{-\infty}^{+\infty} L(y-c)f_y(y)dy \tag{42}$$

L(x) is chosen on the basis of the application. In the present embodiment two alternatives are considered: $L(x)=x^2$ and $L(x)=|x|$.

First, the alternative is considered in which the Loss Function is: $L(x)=x^2$.

If $L(x)=x^2$, c is the mean square estimate of Y, which is $$c=E\{Y\} \tag{43}$$

This is proved in the following. The average risk AR is $$AR = E\{(Y-c)^2\} = \int_{-\infty}^{+\infty} (y-c)^2 f_y(y)dy \tag{44}$$

Differentiating with respect to c results in $$\frac{dAR}{dc} = -2\int_{-\infty}^{+\infty} (y-c)f_y(y)dy \tag{45}$$
$$= -2\int_{-\infty}^{+\infty} yf_y(y)dy + 2\int_{-\infty}^{+\infty} cf_y(y)dy$$

Thus AR is minimum if $$c = \int_{-\infty}^{+\infty} yf_y(y)dy = E\{Y\} \tag{46}$$

Now, the alternative is considered in which the Loss Function is: $L(x)=|x|$.

If $L(x)=|x|$, c which is the median of Y, which is $$c=\text{median}\{Y\} \tag{47}$$

This is proved in the following: The average risk AR is $$AR = E\{|Y-c|\} \tag{48}$$
$$= \int_{-\infty}^{+\infty} |y-c|f_y(y)dy$$
$$= \int_{-\infty}^{c} (c-y)f_y(y)dy + \int_{c}^{+\infty} (y-c)f_y(y)dy$$

Differentiating with respect to c results in $$\frac{dAR}{dc} = \int_{-\infty}^{c} f_y(y)dy - \int_{c}^{+\infty} f_y(y)dy = 2F_y(c) - 1 \tag{49}$$

where Fy is the cumulative density function (CDF) of the random variable Y. Thus R is minimum if $F_y(c)=\frac{1}{2}$, which means that c is the median value of Y.

The estimation problem formulated above is referred to as the classical estimation problem. The estimation is performed solely on the basis of the priori density $f_y(y)$ of the unknown random variable. In certain applications it is possible to perform measurements (observations) on a certain random variable X which is somehow related to Y. In such cases the estimation of Y can be done by using the so-called posterior (after the observation) distribution of Y:$f_{y|x}(y|x)$. The average risk is defined as $$AR = E\{L(Y-c)|X\} = \int_{-\infty}^{+\infty} L(y-c)f_{y|x}(y|X)dy \tag{50}$$

and the estimate for Y is constant c which minimizes the average risk.

The constant c can be determined with calculation similar to the ones which led to (43) and (47); its definition changes according to the choice for the loss function, L(x).

If the loss function is given as $L(x)=x^2$, c is the expected value of Y given the observation X:

$$c=E\{Y|X\} \tag{51}$$

If the loss function is given as $L(x)=|x|$, c is the median value of Y given the observation X:

$$c=\text{median}\{Y|X\} \tag{52}$$

Figure 21:
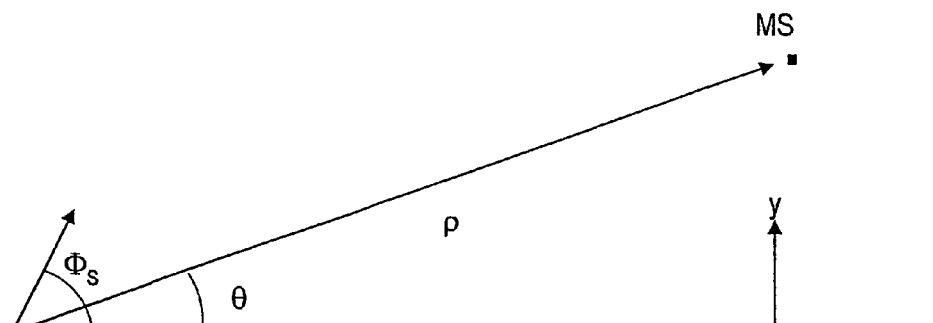
FIG. 21 shows the geometry of the problem according to the fourth embodiment.

Next, the basic geometry of the problem is described by referring to FIG. 21. MS and serving BTS have coordinates (x, y) and ($x_s$, $y_s$) in the (arbitrary) x-y Cartesian reference system represented in the lower right corner of the figure. The distance between mobile and serving BTS is $$\rho(x,y)=\sqrt{(x_s-x)^2+(y_s-y)^2} \tag{53}$$

The Angle Of Arrival of the signal received by the mobile is $$\theta(x,y) = \tan^{-1}\frac{y_s-y}{x_s-x} \tag{54}$$

It results moreover:

$$\begin{cases} x = x_s + \rho\cos(\theta) \\ y = y_s + \rho\sin(\theta) \end{cases} \quad (55)$$

$\rho$ and $\theta$ determine a polar reference system which is completely defined once the coordinates of the serving BTS are fixed in the Cartesian reference system (x, y).

In FIG. 21 also the bearing of the antenna installed in the serving BTS, $\phi_s$, is represented. Angle of arrivals, as well as antenna bearing and other angles, are measured counterclockwise from the x axis.

Now, by using the above teachings, optimal location algorithms according to the fourth embodiment using Cell Identity (CI) and Timing Advance (TA) Information are described.

The location problem in presence of CI and TA information can be formulated by minimizing the loss function defined as in (50), where CI and TA are the observations. The random variables which we want to estimate with a constant are indifferently the (x, y) coordinates or ($\rho$, $\theta$) coordinates of the MS location.

If x and y are estimated, the PDFs of interest are $f_x|_{CI,TA}$(x|CI,TA) and $f_y|_{CI,TA}$(y|CI,TA). The estimation of $\rho$ and $\theta$ is also possible because, since the CI of the serving BTS is an observation, the coordinates of the serving BTS are known; thus the polar reference system ($\rho$, $\theta$) is completely defined (see the above section regarding the geometry of the problem). In case $\rho$ and $\theta$ are estimated, the PDFs of interest are $f_\rho|_{CI,TA}$($\rho$|CI,TA) and $f_\theta|_{CI,TA}$($\theta$|CI,TA).

The definition of the location estimate depends on the choice for the loss function L(x) of equation (50).

First, the alternative is considered in which the loss function is $L(x)=x^2$.

Location Estimate in Cartesian Coordinates.

If the selected loss function is $L(x)=x^2$ and the MS location is estimated in the Cartesian coordinate system, the average risk is defined as follows $$AR = E\{(x-\hat{x})^2 + (y-\hat{y})^2 | CI, TA\} \quad (56)$$

where $\hat{x}$ and $\hat{y}$ are the estimates of the x-y coordinates of the MS location. It can be easily shown that by equating to zero the partial derivatives dAR/d$\hat{x}$ and dAR/d$\hat{y}$, the following definitions for $\hat{x}$ and $\hat{y}$ result:

$$\begin{cases} \hat{x} = E\{x|CI, TA\} = \int_{-\infty}^{+\infty} x f_{x|CI,TA}(x|CI, TA) dx \\ \hat{y} = E\{y|CI, TA\} = \int_{-\infty}^{+\infty} y f_{y|CI,TA}(y|CI, TA) dy \end{cases} \quad (57)$$

where $f_x|_{CI,TA}$(x|CI,TA) and $f_y|_{CI,TA}$(y|CI,TA) are the probability density functions (PDFs) of the x and y coordinates conditioned by the values observed for CI and TA.

In general, $f_x|_{CI,TA}$(x|CI,TA) and $f_y|_{CI,TA}$(y|CI,TA) are marginal PDFs of the joint PDF $f_{xy}|_{CI,TA}$(x,y|CI,TA). They can be calculated as follows:

$$\begin{cases} f_{x|CI,TA}(x|CI, TA) = \int_{-\infty}^{+\infty} f_{xy|CI,TA}(x, y|CI, TA) dy \\ f_{y|CI,TA}(y|CI, TA) = \int_{-\infty}^{+\infty} f_{xy|CI,TA}(x, y|CI, TA) dx \end{cases} \quad (58)$$

Thus, equation (57) becomes $$\begin{cases} \hat{x} = \int_{-\infty}^{+\infty} dy \int_{-\infty}^{+\infty} x f_{xy|CI,TA}(x|CI, TA) dx \\ \hat{y} = \int_{-\infty}^{+\infty} dx \int_{-\infty}^{+\infty} y f_{xy|CI,TA}(y|CI, TA) dy \end{cases} \quad (59)$$

In practical terms, $\hat{x}$ and $\hat{y}$ calculated with (59) represent the mass center of a 2-dimensional region where the mass is distributed according to the PDF $f_{xy}|_{CI,TA}$(x,y|CI,TA).

Location Estimate in Polar Coordinates.

If the CI of the cell is known also the coordinates of the serving BTS are known, thus it is possible to define the estimation problem in the polar reference system ($\rho$, $\theta$). The MS coordinates can be estimated analogously as in (59) by substituting formally (x, y) with ($\rho$, $\theta$):

$$\begin{cases} \hat{\rho} = \int_{-\pi}^{+\pi} d\theta \int_{0}^{+\infty} \rho f_{\rho\theta|CI,TA}(\rho, \theta|CI, TA) d\rho \\ \hat{\theta} = \int_{-\infty}^{+\infty} \theta d\theta \int_{0}^{+\infty} f_{\rho\theta|CI,TA}(\rho, \theta|CI, TA) d\rho \end{cases} \quad (60)$$

where $f_{\rho\theta}|_{CI,TA}$($\rho,\theta$|CI,TA) is the joint PDF of $\rho$ and $\theta$ conditioned by the values observed for CI and TA. The location estimate in polar coordinates obtained with equation (60) minimizes the following average risk:

$$AR = E\{(\rho-\hat{\rho})^2 + (\theta-\hat{\theta})^2 | CI, TA\} \quad (61)$$

Next, the alternative is considered in which the loss function is L(x)=|x|.

If the loss function is L(x)=|x|, the location estimates in (x, y) coordinates and in ($\rho$, $\theta$) coordinates are calculated as median values.

Location Estimate in Cartesian Coordinates.
The average risk is $$AR = E\{|x-\hat{x}| + |y-\hat{y}| | CI, TA\} \quad (62)$$

and the resulting location estimate is given by $$\hat{x} = \text{median}\{x|CI,TA\}; \hat{y} = \text{median}\{y|CI,TA\} \quad (63)$$

Location Estimate in Polar Coordinates.
The average risk is $$AR = E\{|\rho-\hat{\rho}| + |\theta-\hat{\theta}| | CI, TA\} \quad (64)$$

and the resulting location estimate is given by $$\hat{\rho} = \text{median}\{\rho|CI,TA\}; \hat{\theta} = \text{median}\{\theta|CI,TA\} \quad (65)$$

Equations (59) and (60) define the MS location estimates when the loss function to be minimized is $L(x)=x^2$. Equations (63) and (65) define the MS location estimates when the loss function to be minimized is L(x)=|x|. Disregarding the choice for the loss function, the location estimates are optimal in the sense that they minimize the average risk AR.

The location estimate is calculated from the distributions of (x, y) or (ρ, θ) conditioned by the observed values for CI and TA. In case the TA is not available, the same location algorithms can be used, provided that the PDFs used are the PDFs conditioned only by the observed CI value namely, $f_{xy}|_{CI,TA}(x,y|CI,TA)$ and $f_{\rho\theta|CI,TA}(\rho,\theta|CI,TA)$.

Such probability distributions reflect the spatial distribution of users using the timing advance TA when communicating with the cell identified by the CI. To characterize statistically the distribution of users might be difficult in practice, also because in principle the distribution of users in a cell changes with the time; during the day (rush hour or night); during the week (if the cell is serving a stadium with happenings only during week ends), seasonly, etc. However, when statistical data is available, it should be used and the algorithms derived above show how to estimate the MS location from it.

As a modification of the above described fourth embodiment, a location estimate can also be determined based only on the probability densities. That is, a location estimate can be found based on the location of the BTS and the probability density in the cell. In case sufficient information regarding the probability density are available, a suitable accurate location estimate can be obtained. This applies in particular when the different information described above (e.g., roads, population density, geographical information etc.) are combined.

The above description and accompanying drawings only illustrate the present invention by way of example. Thus, the embodiments may vary within the scope of the attached claims.

In particular, the embodiments and the modifications thereof can also be combined. For example, on order to have an even more reliable and accurate location estimate, the fourth embodiment can be combined with the first, second or third embodiment. In this way, probability density and neighbor base stations would be used for the location procedure.

Furthermore, it is again noted that the invention is not limited to GSM, but can also be applied to other mobile telecommunication systems like UMTS and the like.

The invention claimed is:

1. A method, comprising:
    obtaining coordinates of a second network element to which a first network element is connected or attached;
    retrieving a predetermined non-uniform geographical serving area that is served by the second network element;
    detecting a propagation delay of the first network element with respect to the second network element;
    determining a propagation delay depending area, which is an area having a distance to the second network element that is determined based on the propagation delay, and a width that is determined based on a detection uncertainty of the propagation delay;
    forming an intersection area of the predetermined non-uniform geographical serving area and the propagation delay depending area; and
    determining a location estimate of the first network element from the intersection area,
    wherein the determining the propagation delay depending area comprises using information about a probability density of locations of the first network element.

2. The method according to claim 1, wherein determining the propagation delay depending area comprises calculating an estimated distance to determine the distance to the second network element and calculating a confidence interval for the estimated distance, wherein the confidence interval is the width of the propagation delay depending area.

3. The method according to claim 1, wherein calculation of location estimates in dependence on the predetermined non-uniform geographical serving area of the second network element is performed beforehand.

4. The method according to claim 1, wherein the predetermined non-uniform geographical serving area is a geographical region the borders of which are mathematically defined by the coordinates of the origin, the orientation of the serving area measured taking as origin of a polar reference $\phi_s$, the angular width of the serving area $\Delta\phi_s$, a front radius that defines the distance from the origin in the angular region inside the range $\phi_s \pm \Delta\phi_s$, and a back radius that defines the distance from the origin in the angular region outside the range $\phi_s \pm \Delta\phi_s$.

5. The method according to claim 4, further comprising:
    storing the location estimates calculated beforehand in look-up tables, wherein the location estimates are configured to be retrieved based on the identity of the second network element.

6. The method according to claim 1, further comprising:
    identifying neighbor network elements, which can be received by the first network element; and
    obtaining hearability areas defining areas in which a signal level of neighbor network elements is equal to or higher than a predetermined signal level,
    wherein the forming an intersection area comprises forming an intersection area of the predetermined non-uniform serving area and the hearability areas of those neighbor network elements.

7. The method of claim 1, wherein the predetermined non-uniform geographical serving area is predetermined by a network planning tool using a plurality of serving area parameters comprising at least one of base transceiver station configuration parameters, three-dimensional terrain maps, tuned propagation models, and parameters corresponding to other base transmission stations.

8. An apparatus, comprising:
    a processor; and
    a memory including computer program code,
    the memory and the computer program code configured to with the processor, cause the apparatus at least to
        obtain coordinates of a second network element, to which a first network element is connected or attached,
        retrieve a predetermined non-uniform geographical serving area that is served by the second network element,
        detect a propagation delay of the first network element with respect to the second network element,
        determine a propagation delay depending area, which is an area having a distance to the second network element which is determined based on the propagation delay and a width which is determined based on a detection uncertainty of the propagation delay,
        form an intersection area of the predetermined non-uniform geographical serving area and the propagation delay depending area, and
        determine a location estimate of the first network element from the intersection area,
    wherein the memory and the computer program code are configured to, with the processor, cause the apparatus at least to determine the propagation delay depending area using information about a probability density of locations of the first network element.

9. The apparatus according to claim 8, wherein the memory and the computer program code are further configured to, with the processor, cause the apparatus at least to calculate an estimated distance in order to determine the distance to the second network element, and to calculate a confidence interval for the estimated distance, the confidence interval being the width of the propagation delay depending area.

10. The apparatus according to claim 9, wherein the apparatus is a location server.

11. The network location system comprising a apparatus according to claim 10, and a network management device for preparing the look-up table.

12. The network location system according to claim 11, wherein the network management device is a location management tool.

13. An apparatus, comprising:
a serving area determining means for obtaining coordinates of a second network element, to which a first network element is connected or attached, and for retrieving a predetermined non-uniform geographical serving area that is served by the second network element;
a propagation delay depending area detecting means for detecting a propagation delay of the first network element with respect to the second network element, and for determining a propagation delay depending area, which is an area having a distance to the second network element which is determined based on the propagation delay and a width which is determined based on a detection uncertainty of the propagation delay; and
a location estimating means for forming an intersection area of the predetermined non-uniform geographical serving area and the propagation delay depending area, and for determining a location estimate of the first network element from the intersection area,
wherein the propagation delay depending area detecting means determines the propagation delay depending area using information about a probability density of locations of the first network element.

14. The apparatus of claim 8, wherein the predetermined non-uniform geographical serving area is predetermined by a network planning tool using a plurality of serving area parameters comprising at least one of base transceiver station configuration parameters, three-dimensional terrain maps, tuned propagation models, and parameters corresponding to other base transmission stations.

15. The apparatus of claim 13, wherein the predetermined non-uniform geographical serving area is predetermined by a network planning tool using a plurality of serving area parameters comprising at least one of base transceiver station configuration parameters, three-dimensional terrain maps, tuned propagation models, and parameters corresponding to other base transmission stations.

16. A computer readable medium having computer executable components for performing a method, comprising:
obtaining coordinates of a second network element to which a first network element is connected or attached;
retrieving a predetermined non-uniform geographical serving area that is served by the second network element;
detecting a propagation delay of the first network element with respect to the second network element;
determining a propagation delay depending area, which is an area having a distance to the second network element that is determined based on the propagation delay, and a width that is determined based on a detection uncertainty of the propagation delay;
forming an intersection area of the predetermined non-uniform geographical serving area and the propagation delay depending area; and
determining a location estimate of the first network element from the intersection area,
wherein the determining the propagation delay depending area comprises using information about a probability density of locations of the first network element.

* * * * *